(12) United States Patent
Twitchell, Jr. et al.

(10) Patent No.: US 7,583,769 B2
(45) Date of Patent: *Sep. 1, 2009

(54) OPERATING GPS RECEIVERS IN GPS-ADVERSE ENVIRONMENT

(75) Inventors: Robert W. Twitchell, Jr., Cumming, GA (US); Delia J. Smith, Morris Township, NJ (US)

(73) Assignee: Terahop Netowrks, Inc., Alpharetta, GA (US)

( * ) Notice: Subject to any disclaimer, the term of this patent is extended or adjusted under 35 U.S.C. 154(b) by 564 days.

This patent is subject to a terminal disclaimer.

(21) Appl. No.: 11/424,847

(22) Filed: Jun. 16, 2006

(65) Prior Publication Data

US 2007/0001898 A1    Jan. 4, 2007

Related U.S. Application Data

(60) Provisional application No. 60/595,233, filed on Jun. 16, 2005.

(51) Int. Cl.
*H04B 1/10* (2006.01)
(52) U.S. Cl. .................... 375/349; 375/347; 375/148
(58) Field of Classification Search ................ 375/130, 375/144, 148, 316, 349, 347
See application file for complete search history.

(56) References Cited

U.S. PATENT DOCUMENTS

| | | |
|---|---|---|
| 3,805,265 A | 4/1974 | Lester |
| 4,165,024 A | 8/1979 | Oswalt et al. |
| 4,613,990 A | 9/1986 | Halpern |
| 4,680,583 A | 7/1987 | Grover |
| 4,688,244 A | 8/1987 | Hannon et al. |

(Continued)

FOREIGN PATENT DOCUMENTS

EP          0467036 A2       1/1992

(Continued)

OTHER PUBLICATIONS

"Scalable Routing Strategies for Ad hoc Wireless Networks", Atsushi Iwata et al., IEEE Journal on Selected Areas in Communications, Special Issue on Adhoc Networks, Aug. 1999, pp. 1369-1379.

(Continued)

*Primary Examiner*—Emmanuel Bayard
(74) *Attorney, Agent, or Firm*—Tillman Wright, PLLC; Chad D. Tillman; James D. Wright

(57) ABSTRACT

A system for operating a GPS receiver in a GPS-adverse environment includes a plurality of GPS receivers, a plurality of remote sensor interfaces (RSIs), and a computer management system. The GPS receivers are adapted to determine positional parameters based on the GPS satellite signals. A first set of GPS receivers is able to accurately determine its positional parameters and a second set of GPS receivers is unable to do so. Each RSI is associated with a respective GPS receiver. The RSIs are communication nodes in an ad hoc wireless network. The computer management system identifies a GPS receiver that is not accurately determining its positional parameters, and in response, causes GPS information to be provided from one of the first set of GPS receivers to the identified GPS receiver. The identified GPS receiver then determines its positional parameters accurately using the provided GPS information.

12 Claims, 18 Drawing Sheets

U.S. PATENT DOCUMENTS

| | | |
|---|---|---|
| 4,750,197 A | 6/1988 | Denekamp et al. |
| 4,817,537 A | 4/1989 | Cripe et al. |
| 5,040,238 A | 8/1991 | Comroe et al. |
| 5,054,052 A | 10/1991 | Nonami |
| 5,117,501 A | 5/1992 | Childress et al. |
| 5,129,096 A | 7/1992 | Burns |
| 5,210,540 A | 5/1993 | Masumoto |
| 5,265,025 A | 11/1993 | Hirata |
| 5,295,154 A | 3/1994 | Meier et al. |
| 5,331,637 A | 7/1994 | Francis et al. |
| 5,369,784 A | 11/1994 | Nelson |
| 5,400,254 A | 3/1995 | Fujita |
| 5,425,051 A | 6/1995 | Mahany |
| 5,442,758 A | 8/1995 | Slingwine et al. |
| 5,511,232 A | 4/1996 | O'Dea et al. |
| 5,565,858 A | 10/1996 | Guthrie |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,606,313 A | 2/1997 | Allen et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,077 A | 3/1998 | Whitehead |
| 5,761,195 A | 6/1998 | Lu et al. |
| 5,790,946 A | 8/1998 | Rotzoll |
| 5,793,882 A | 8/1998 | Piatek et al. |
| 5,833,910 A | 11/1998 | Teixido |
| 5,862,803 A | 1/1999 | Besson |
| 5,890,054 A | 3/1999 | Logsdon et al. |
| 5,892,441 A | 4/1999 | Woolley et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,951,613 A * | 9/1999 | Sahm et al. .................. 701/50 |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,928 A | 10/2000 | Issacman |
| 6,127,976 A | 10/2000 | Boyd et al. |
| 6,134,587 A | 10/2000 | Okanoue |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,437,692 B1 | 8/2002 | Petite |
| 6,473,607 B1 | 10/2002 | Shohara et al. |
| 6,476,708 B1 | 11/2002 | Johnson |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,587,755 B1 | 7/2003 | Smith et al. |
| 6,600,418 B2 | 7/2003 | Francis et al. |
| 6,611,556 B1 | 8/2003 | Koener et al. |
| 6,614,349 B1 | 9/2003 | Proctor et al. |
| 6,617,962 B1 | 9/2003 | Horwitz et al. |
| 6,665,585 B2 | 12/2003 | Kawase |
| 6,700,533 B1 | 3/2004 | Werb et al. |
| 6,720,888 B2 | 4/2004 | Eagleson et al. |
| 6,737,974 B2 | 5/2004 | Dickinson |
| 6,745,027 B2 | 6/2004 | Twitchell, Jr. |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Zhou et al. |
| 6,919,803 B2 | 7/2005 | Breed |
| 6,927,688 B2 | 8/2005 | Tice |
| 6,934,540 B2 | 8/2005 | Twitchell, Jr. |
| 6,940,392 B2 | 9/2005 | Chan et al. |
| 6,975,614 B2 | 12/2005 | Kennedy |
| 6,999,780 B1 | 2/2006 | Zhao |
| 7,012,529 B2 | 3/2006 | Sajkowsky |
| 7,027,773 B1 | 4/2006 | McMillin |
| 7,088,229 B2 | 8/2006 | Johnson |
| 7,098,784 B2 | 8/2006 | Easley et al. |
| 7,103,344 B2 | 9/2006 | Menard |
| 7,126,470 B2 | 10/2006 | Clift et al. |
| 7,133,704 B2 | 11/2006 | Twitchell, Jr. |
| 7,142,121 B2 | 11/2006 | Chan et al. |
| 7,155,264 B2 | 12/2006 | Twitchell, Jr. |
| 7,191,934 B2 | 3/2007 | Miller et al. |
| 7,196,622 B2 | 3/2007 | Lambright et al. |
| 7,200,132 B2 | 4/2007 | Twitchell, Jr. |
| 7,209,468 B2 | 4/2007 | Twitchell, Jr. |
| 7,209,771 B2 | 4/2007 | Twitchell, Jr. |
| 7,212,122 B2 | 5/2007 | Gloekler et al. |
| 7,221,668 B2 | 5/2007 | Twitchell, Jr. |
| 7,230,933 B2 | 6/2007 | Bahl et al. |
| 7,233,284 B2 | 6/2007 | Velicer |
| 7,282,944 B2 | 10/2007 | Gunn et al. |
| 7,313,421 B2 | 12/2007 | Dejanovic |
| 7,315,281 B2 | 1/2008 | Dejanovic |
| 7,319,397 B2 | 1/2008 | Chung |
| 7,340,260 B2 | 3/2008 | McAlexander |
| 7,348,875 B2 | 3/2008 | Hughes et al. |
| 7,349,803 B2 | 3/2008 | Belenkii et al. |
| 7,349,804 B2 | 3/2008 | Belenkii et al. |
| 7,376,507 B1 | 5/2008 | Daily et al. |
| 7,391,321 B2 | 6/2008 | Twitchell |
| 7,440,781 B2 | 10/2008 | Beach et al. |
| 2001/0000019 A1 | 3/2001 | Bowers et al. |
| 2001/0050550 A1 | 12/2001 | Yoshida et al. |
| 2002/0039896 A1 | 4/2002 | Brown |
| 2002/0050932 A1 | 5/2002 | Rhoades et al. |
| 2002/0089434 A1 | 7/2002 | Ghazarian |
| 2002/0098861 A1 | 7/2002 | Doney et al. |
| 2002/0119770 A1 | 8/2002 | Twitchell, Jr. |
| 2002/0146985 A1 | 10/2002 | Naden |
| 2003/0008692 A1 | 1/2003 | Phelan |
| 2003/0083064 A1 | 5/2003 | Cooper |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0182077 A1 | 9/2003 | Emord |
| 2003/0209601 A1 | 11/2003 | Chung |
| 2003/0236077 A1 | 12/2003 | Sivard |

| | | | |
|---|---|---|---|
| 2004/0021572 A1 | 2/2004 | Schoen et al. | |
| 2004/0041731 A1 | 3/2004 | Hisano | |
| 2004/0082296 A1 | 4/2004 | Twitchell, Jr. | |
| 2004/0100394 A1 | 5/2004 | Hitt | |
| 2004/0100415 A1 | 5/2004 | Veitch et al. | |
| 2004/0119588 A1 | 6/2004 | Marks | |
| 2004/0121793 A1 | 6/2004 | Weigele et al. | |
| 2004/0135691 A1 | 7/2004 | Duron et al. | |
| 2004/0183673 A1 | 9/2004 | Nageli | |
| 2004/0232924 A1 | 11/2004 | Hilleary et al. | |
| 2004/0233041 A1 | 11/2004 | Bohman et al. | |
| 2004/0233054 A1 | 11/2004 | Neff et al. | |
| 2004/0246463 A1 | 12/2004 | Milinusic | |
| 2005/0043068 A1 | 2/2005 | Shohara et al. | |
| 2005/0073406 A1 | 4/2005 | Easley et al. | |
| 2005/0087235 A1 | 4/2005 | Skorpik | |
| 2005/0088299 A1 | 4/2005 | Bandy et al. | |
| 2005/0090211 A1 | 4/2005 | Lilja et al. | |
| 2005/0093702 A1 | 5/2005 | Twitchell, Jr. | |
| 2005/0093703 A1 | 5/2005 | Twitchell, Jr. | |
| 2005/0128080 A1 | 6/2005 | Hall et al. | |
| 2005/0145018 A1 | 7/2005 | Sabata et al. | |
| 2005/0146445 A1 | 7/2005 | Sleboda et al. | |
| 2005/0190759 A1 | 9/2005 | Lee et al. | |
| 2005/0199716 A1 | 9/2005 | Shafer et al. | |
| 2005/0215280 A1 | 9/2005 | Twitchell, Jr | |
| 2005/0226201 A1 | 10/2005 | McMillin | |
| 2005/0246133 A9 * | 11/2005 | Mann | 702/175 |
| 2005/0261037 A1 | 11/2005 | Raghunath et al. | |
| 2005/0270160 A1 | 12/2005 | Chan et al. | |
| 2006/0022872 A1 | 2/2006 | Zimmerman | |
| 2006/0109106 A1 | 5/2006 | Braun | |
| 2006/0114102 A1 | 6/2006 | Chang et al. | |
| 2006/0132485 A1 * | 6/2006 | Milinusic | 345/419 |
| 2006/0135145 A1 | 6/2006 | Redi | |
| 2006/0163422 A1 | 7/2006 | Krikorian et al. | |
| 2006/0164232 A1 | 7/2006 | Waterhouse et al. | |
| 2006/0164239 A1 | 7/2006 | Loda | |
| 2006/0270382 A1 | 11/2006 | Lappetelainen et al. | |
| 2007/0001898 A1 | 1/2007 | Twitchell | |
| 2007/0008408 A1 | 1/2007 | Zehavi | |
| 2007/0032951 A1 | 2/2007 | Tanenhaus et al. | |
| 2007/0040732 A1 | 2/2007 | Burgett et al. | |
| 2007/0099628 A1 | 5/2007 | Twitchell | |
| 2007/0099629 A1 | 5/2007 | Twitchell | |
| 2007/0135179 A1 | 6/2007 | Hardman et al. | |
| 2008/0096583 A1 | 4/2008 | Karaoguz et al. | |
| 2008/0264888 A1 * | 10/2008 | Zakula et al. | 212/276 |
| 2008/0309550 A1 | 12/2008 | Sairo et al. | |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 0944014 | 9/1999 |
| EP | 1317733 A2 | 6/2003 |
| EP | 1692599 A2 | 8/2006 |
| EP | 1692668 A2 | 8/2006 |
| GB | 2308947 | 7/1997 |
| KR | 2005-0102419 | 10/2005 |
| KR | 2007-0005515 A | 1/2007 |
| WO | WO0068907 | 11/2000 |
| WO | WO0069186 | 11/2000 |
| WO | 03098175 | 11/2003 |

OTHER PUBLICATIONS

"Cluster Based Routing Protocol", Internet-Draft Mingliang, Jiang et al., National University of Singapore, Jul. 1999.

Gary Morgan, Miniature Tags Provide Visibility & Cohesion for an LIA Battalion Level 'Proof of Principle', Pacific NW National Laboratory, Apr. 2001, Gary.morgan@pnl.gov.

Kevin Sharp, Physical Reality: A Second Look, Supply Chain Systems, http://www.idsystems.com/reader/1999_03/phys0399_pt2/index.htm, Mar. 1999, Helmers Publishing, Inc.

U.S. Appl. No. 60/444,029, of Nageli, filed Jan. 31, 2003.

Ram Ramanathan et al., Hierarchically-Organized, Multihop Mobile Wireless Networks for Quality-of-Service Support, pp. 1-35, 1998.

Guangyu Pei et al., Mobility Management in Hierarchical Multi-hop Mobile Wireless Networks, 6 pages, 1999.

http://www/iprg/nokia.com/charliep/txt/manet/term.txt, Mobile Ad Hoc Networking Terminology, C. Perkins, Nov. 17, 1998, visited Nov. 13, 2000.

Daniel Lihui Gu et al., C-ICAMA, A Centralized Intelligent Channel Assigned Multiple Access for Multi-Layer Ad-Hoc Wireless Networks with UAVs, 6 pages, 2000.

Atsushi Iwata, et al., Scalable Routing Strategies for Ad Hoc Wireless Networks, IEEE Journal on Selected Areas in Communications, vol. 17, No. 8, Aug. 1999, pp. 1369-1379.

http://www.cs.ucla.edu/NRL/wireless/PAPER/draft-ietf-manet-admrp-02.txt, Sung-Ju Lee et al., On-Demand Multicast Routing Protocol (ODMRP) for Ad Hoc Networks, Jan. 2000, visited Nov. 13, 2000.

Guangyu Pei, et al., A Wireless Hierarchical Routing Protocol with Group Mobility, 1998 IEEE, 5 pages.

Charles E. Perkins, Ad Hoc Networks, Jan. 2001, table of contents, chapters 1, 4, and 11.

J.J. Gardia-Luna-Aceves et al., Source-Tree Routing in Wireless Networks, 1999, 10 pages.

Jean-Pierre Hubaux et al., Toward Self-Organized Mobile Ad Hoc Networks: The Terminodes Project, IEEE Communications Magazine, Jan. 2001, pp. 118-124.

Jaap Haartsen et al., Bluetooth: Vision, Goals, and Architecture, Mobile Computing & Communications Review, vol. 1, No. 2, 1998, 8 pages.

Jaap Haartsen, Bluetooth-The Universal Radio Interface for Ad Hoc, Wireless Connectivity, Ericsson Review No. 3, pp. 110-117, 1998.

Ezio Valdevit, Cascading in Fibre Channel: How to Build a Multi-Switch Fabric, pp. 1-12.

Daniel Lihui Gu et al., Hierarchical Routing for Multi-Layer Ad-Hoc Wireless Networks with UAV's, 5 pages, 2000.

U.S. Appl. No. 60/499,338, of Easley et al., filed Sep. 3, 2003.

Keshavarzian et al., Energy-Efficient Link Assessment in Wireless Sensor Networks, INFOCOM 2004. 23rd Annual Joint Conference of the IEEE Computer and Communications Societies, vol. 3, 2004, pp. 1751-1761.

Stojmenovic et al., Design Giudelines for Routing Protocols in Ad Hoc and Sensor Networks with a Realistic Physical Layer, Communications Magazine, IEEE, vol. 43, Issue 3, Mar. 2005, pp. 101-106.

Melodia et al., On the Interdependence of Distributed Topology Control and Geographical Routing in Ad Hoc and Sensor Networks, Selected Areas in Communications, IEEE Journal, vol. 23, Issue 3, Mar. 2005, pp. 520-532.

* cited by examiner

OPERATING GPS RECEIVERS IN GPS-ADVERSE ENVIRONMENT

I. CROSS-REFERENCE TO RELATED APPLICATIONS

The present application is a nonprovisional of, and claims priority under 35 U.S.C. § 119(e) to Twitchell et al., U.S. Provisional Patent Application No. 60/595,233 filed Jun. 16, 2005. The entire disclosure of this patent application is hereby incorporated herein by reference.

II. INCORPORATION BY REFERENCE

The present application hereby incorporates by reference: Twitchell U.S. Pat. No. 6,745,027 B2 (titled "Class Switched Networks for Tracking Articles"); Twitchell International Patent Application Publication No. WO 03/032501 A2, which international patent application designated the United States and was published in English (titled "Network Formation in Asset-Tracking System Based on Asset Class"); Twitchell International Patent Application Publication No. WO 03/098851 A1, which international patent application designated the United States and was published in English (titled "LPRF Device Wake Up Using Wireless Tag"); Twitchell U.S. Patent Application Publication No. 2005/0093703 A1 (titled "Systems and Methods Having LPRF Device Wake Up Using Wireless Tag"); Twitchell U.S. Patent Application Publication No. 2005/0093702 A1 (titled "Manufacture of LPRF Device Wake Up Using Wireless Tag"); and Twitchell U.S. Patent Application Publication No. 2004/0082296 A1 (titled "Network Formation in Asset-Tracking System Based on Asset Class").

III. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

IV. BACKGROUND OF THE INVENTION

Satellite navigation systems, such as the system commonly known as the Global Positioning System ("GPS"), operated by the United States Department of Defense, are well known. Satellite navigation systems are used for determining a precise location almost anywhere on Earth. In particular, GPS can be used by anyone, free of charge, to make such determinations. For this reason, among others, satellite navigation systems are generically referred to hereinafter as GPS.

GPS is divided into three segments: space, control, and user. The space segment comprises the GPS satellite constellation. The control segment comprises ground stations around the world that are responsible for monitoring the flight paths of the GPS satellites, synchronizing the satellites' onboard atomic clocks, and uploading data for transmission by the satellites. The user segment consists of GPS receivers used for both military and civilian applications.

The GPS system uses a satellite constellation of at least 24 active satellites orbiting about 20,000 km above the Earth. Each satellite makes a complete orbit of the Earth every 12 hours. Satellite positions are carefully calculated so that, from any point on the Earth, four or more of the satellites will be in direct line of sight to any location. Each satellite carries four atomic clocks so that the transmission time of the signals is known precisely. The flight paths of the satellites are measured by five monitor stations around the world. A master control station processes their combined observations and sends updates to the satellites through monitor stations. The updates synchronize the atomic clocks on board each satellite to within one microsecond and also adjust the ephemeris of the satellites' internal orbital model to match the observations of the satellites from the ground.

GPS receivers calculate their current position, i.e., latitude, longitude, elevation, and the precise time using the process of trilateration. Trilateration involves measuring the distance to at least four satellites by comparing the satellites' coded time signal transmissions. The receiver calculates the orbit of each satellite based on information encoded in its radio signal and measures the distance to each satellite based on the time delay from when the satellite signal was sent until it was received.

Once the location and distance of each satellite is known, the receiver should theoretically be located at the intersection of four imaginary spheres, one around each satellite, with a radius equal to the time delay between the satellite and the receiver multiplied by the speed of the radio signals.

In practice, GPS calculations are more complex for several reasons. One complication is that GPS receivers do not have atomic clocks, so the precise time is not known when the signals arrive. Fortunately, even the relatively simple clock within the receiver provides an accurate comparison of the timing of the signals from the different satellites. The receiver is able to determine exactly when the signals were received by adjusting its internal clock (and therefore the spheres' radii) so that the spheres intersect near one point.

GPS is used for both military and civilian purposes. The primary military purposes are to allow improved command and control of forces through improved location awareness and to facilitate accurate targeting of smart bombs, cruise missiles, or other munitions. Civilians use GPS for location determination and navigation purposes. Low cost GPS receivers are widely available, combined in a bundle with a PDA or car computer. As such, the GPS system is used as a navigation aid in airplanes, ships and cars. The GPS system can also be used by computer controlled harvesters, mine trucks and other vehicles.

GPS signals can be affected by multipath issues, where radio signals reflect off surrounding terrain such as buildings, canyon walls, hard ground, etc. causing delay in when a signal reaches a receiver. This delay causes inaccuracy in position location. Multipath issues are particularly present in urban environments where a significant amount of obstructions are present. A variety of receiver techniques have been developed to mitigate multipath errors. For long delay multipath, the receiver itself can recognize the wayward signal and discard it. To address shorter delay multipath due to the signals reflecting off the ground, specialized antennas may be used. However, this form of multipath is harder to filter out as it is only slightly delayed as compared to the direct signal, thus causing effects almost indistinguishable from routine fluctuations in atmospheric delay.

Additionally, successful transmission of radio signals, including GPS signals, may be disrupted through the use of jamming technology. Devices making use of such technology, often referred to as "jammers," can cause navigation and communication problems for radio signal receivers. Radio receivers can be jammed in simple ways, such as by transmitting radio frequency noise in the frequency spectrum in which the receiver operates. More sophisticated jammers use various techniques to alter radio signals like those being sent from satellites. Such techniques may include trying to attack modulation schemes, fooling a receiver into locking onto incorrect radio signals, or mixing signals that inhibit a receiver from demodulating the data of the signal. As used herein, the term "GPS deniers" or "GPS denial devices" shall generally refer collectively to GPS jammers, GPS repeaters (devices that rebroadcast or repeat GPS signals or GPS-like signals, thereby creating confusion for GPS receivers), GPS interrupters (devices that use such techniques as crossover bands and disruptive cancellation to interrupt GPS radio signals from the GPS satellites), and all other devices that are or may be used to disrupt reliable operation of GPS receivers.

GPS is particularly vulnerable to signal disruption because GPS receivers are extremely sensitive. The receivers have to be sensitive to receive relatively weak signals from orbiting satellites. A relatively low-powered jammer, transmitting on the GPS frequency band, can overpower legitimate GPS signals over a wide area—as much as a 100 kilometer circle at just 1 watt radiated power. GPS receivers are so sensitive that there have been documented situations of unintentional jamming. In one such situation three separate jamming signals were being generated by VHF/UHF television antenna preamplifiers. The signals from the preamplifiers were strong enough to completely jam GPS within a one-kilometer radius at sea level.

Because the U.S. military relies heavily on GPS for location determination, the vulnerability of military GPS receivers to being intentionally jammed is particularly critical. GPS jammers and other GPS denial devices may be used to deny signal acquisition and/or confuse a GPS receiver into giving erroneous results. Preventing the denial of GPS to troops in the field is potentially crucial in preventing causalities and carrying out successful military operations. Further exacerbating the problem is the fact that GPS denial devices are difficult to detect and find. Accordingly, a system for detecting and/or locating such jammers is needed.

A related problem pertains to the use of jamming technology against an adversary while minimizing the effects of such use on one's own GPS receivers. More specifically, jamming technology is often difficult to control, affecting friendly GPS receivers the same way as adversarial GPS receivers. If GPS jamming technology is being used anywhere in the vicinity, by a friendly party or an adversarial party, it may not be possible to rely on one's GPS receivers, thus requiring friendly forces to operate with reduced accuracy or, perhaps worse, to operate under the impression that their GPS information is accurate when in fact it is not. Accordingly, a need exists for means to control the use of friendly GPS jamming technology such that the effects of the friendly GPS jammers on one's own GPS receivers are minimized and/or localized.

The foregoing issues highlight a further, over-arching problem, which relates to the need for an easily-deployable system capable of jamming, on a controllable, localized level, enemy GPS receivers while predicting areas in which friendly GPS receivers may be used safely. More particularly, the latter problem requires the ability to identify jamming effects caused by both enemy GPS jammers and friendly GPS jammers.

V. SUMMARY OF THE INVENTION

The present invention includes many aspects and features.

In a first aspect of the invention, a system for detecting a GPS denial device includes: a plurality of GPS receivers for receiving radio signals from GPS satellites, wherein each of the plurality of GPS receivers determines parameters based on the signals received from the GPS satellites, the parameters including positional parameters; a plurality of remote sensor interfaces, each remote sensor interface of the plurality of remote sensor interfaces being associated with a respective GPS receiver of the plurality of GPS receivers such that each remote sensor interface extracts the GPS parameters from a respective GPS receiver, wherein the plurality of remote sensor interfaces are communication nodes in an ad hoc wireless network; a gateway, serving as a communication node in the ad hoc wireless network, that receives the extracted GPS parameters from one or more of the plurality of remote sensor interfaces; and a computer management system, disposed in communication with the gateway, that receives the extracted GPS parameters from the gateway and compares the determined GPS parameters with historical GPS parameters for the plurality of GPS receivers to detect whether an active GPS denial device is present in the vicinity of the system.

In a feature of this aspect, the parameters determined by the plurality of GPS receivers include positional parameters. The positional parameters may include latitude and longitude, and the may include non-positional GPS parameters, such as parameters pertaining to one or more GPS signals.

In another feature of this aspect, each GPS receiver of the plurality of GPS receivers is directly associated with a respective remote sensor interface of the plurality of remote sensor interfaces. Each GPS receiver and the respective remote sensor interface with which it is directly associated may be integrated into a unitary component contained within a single housing, or each GPS receiver and the respective remote sensor interface with which it is directly associated may be physically separated from one another and contained in different housings. Each GPS receiver and the respective remote sensor interface with which it is directly associated may be connected wirelessly, or each GPS receiver and the respective remote sensor interface with which it is directly associated may be connected by way of a cabled connection.

In yet another feature of this aspect, at least one remote sensor interface of the plurality of remote sensor interfaces includes a standards based radio. Further, the at least one remote sensor interface may include a Wake-Up Receiver. The Wake-Up Receiver is adapted receive a wireless wake-up signal and to activate the standards based radio in response thereto, and the gateway includes a Wake-Up Transmitter that is adapted to transmit a wireless wake-up signal to activate the standards based radio. Further, the gateway includes a standards based radio adapted to communicate with the standards based radio of the at least one remote sensor. The standards based radio of the at least one remote sensor is adapted to communicate with the gateway via other remote sensor interfaces using hopping.

In still another feature, the computer management system includes at least one server. The server may be physically co-located with the gateway, or the at least one server may be a central server communicatively connected to the gateway via an external network.

In still another feature, the system further includes a GPS denier, associated with one of the remote sensor interfaces, for disrupting reliable operation of GPS receivers. The GPS denier is adapted to be selectively activated. The GPS denier is associated with the remote sensor interface such that the remote sensor interface effectuates the activation of the GPS denier. The gateway communicates instructions to the remote sensor interface with which the GPS denier is associated in order to selectively activate the GPS denier. The computer management system controls the instructions communicated by the gateway, thereby selectively controlling the activation of the GPS denier.

In a second aspect of the invention, a method for detecting a GPS denial device includes: receiving radio signals from GPS satellites; determining GPS parameters based on the received radio signals; transmitting the parameters; and comparing determined GPS parameters to historical GPS parameters to detect the presence of a GPS denial device.

In a feature of this aspect, the method further includes the step of providing a plurality of GPS receivers that each carry out the steps of receiving radio signals from GPS satellites and determining GPS parameters based on the received radio signals. The method further includes the step of providing a plurality of remote sensor interfaces that each carry out the step of transmitting the parameters. The step of providing a plurality of remote sensor interfaces may include the step of providing a plurality of remote sensor interfaces that each include a standards based radio that carries out the step of transmitting the parameters, and may include a step of providing a plurality of remote sensor interfaces includes associating each remote sensor interface with a respective GPS receiver.

In another feature of this aspect, the step of transmitting the parameters includes transmitting the parameters via an ad hoc wireless network. Additionally, the method further includes the steps of: receiving the transmitted parameters at a gateway; and communicating the received parameters from the gateway to a computer management system. The step of communicating the received parameters to a computer management system includes communicating the received parameters via an external network.

In a third aspect of the invention, a method of determining the location of a GPS denial device includes: in an area of interest, deploying a plurality of GPS receivers, each interfaced with a respective remote sensor interface, the remote sensor interfaces being communication nodes in an ad hoc wireless network; relaying GPS parameters from the plurality of GPS receivers to a computer management system via the ad hoc wireless network; assessing the relative accuracy of GPS parameters determined by at least two of the plurality of GPS receivers, the accuracy of the GPS parameters of one of the at least two GPS receivers being significantly greater than the accuracy of the GPS parameters of the other of the at least two GPS receivers; and determining at least an approximate direction, relative to one or more of the at least two GPS receivers, in which a GPS denial device is likely to be located, the determination being based on the relative accuracies of the at least two GPS receivers.

In a fourth aspect of the invention, a system for operating a GPS receiver in a GPS-adverse environment includes: a plurality of GPS receivers for receiving radio signals from GPS satellites, wherein each of the plurality of GPS receivers is adapted to determine parameters for itself based on the signals received from the GPS satellites, the parameters including positional parameters, wherein at least one of the GPS receivers, defining a first set of GPS receivers, is able to accurately determine its positional parameters and at least one other of the GPS receivers, defining a second set of GPS receivers, is unable to determine its positional parameters accurately; a plurality of remote sensor interfaces, each remote sensor interface of the plurality of remote sensor interfaces being associated with and in electronic communication with a respective GPS receiver of either the first set or second set of GPS receivers such that each remote sensor interface is adapted to extract the GPS parameters from a respective GPS receiver, wherein the plurality of remote sensor interfaces are communication nodes in an ad hoc wireless network such that each of said plurality of remote sensor interfaces is in electronic communication with the other remote sensor interfaces of the plurality of remote sensor interfaces; and a computer management system that identifies a GPS receiver that is not accurately determining its positional parameters, and in response, causes GPS information to be provided from a selected GPS receiver in the first set of GPS receivers to the identified GPS receiver; whereby the identified GPS receiver is adapted to determine its positional parameters accurately using the at least the GPS information provided from the selected GPS receiver in the first set of GPS receivers.

In a feature of this aspect, the computer management system is co-located with identified GPS receiver at the remote sensor interface associated therewith.

In another feature of this aspect, the computer management system is co-located with selected GPS receiver, of the first set of GPS receivers, at the remote sensor interface associated therewith.

In yet another feature of this aspect, the computer management system is located remotely from the remote sensor interfaces.

In still another feature of this aspect, the system further includes a gateway, serving as a communication node in the ad hoc wireless network, that is adapted to receive the extracted GPS parameters from one or more of the plurality of remote sensor interfaces. Additionally, the computer management system is co-located with the gateway.

In still another feature of this aspect, the computer management system is adapted to identify the GPS receiver that is not accurately determining its positional parameters by receiving the extracted GPS parameters from the identified receiver and comparing the determined GPS parameters with historical GPS parameters for the identified GPS receiver.

In still another feature of this aspect, the GPS information includes at least one of Ephemeris information, Almanac information, GPS time information, approximate location information, and information on GPS satellites that should be in view of the identified GPS receiver.

In still another feature of this aspect, each remote sensor interface includes a standards based radio adapted for transmitting and receiving the GPS information. Additionally, the at least one remote sensor interface includes a Wake-Up Receiver, and the Wake-Up Receiver is adapted receive a wireless wake-up signal and to activate the standards based radio in response thereto.

In a fifth aspect of the invention, a method for determining a location of a GPS receiver in a GPS-adverse environment includes: providing a plurality of GPS receivers, each interfaced with a respective remote sensor interface, the remote sensor interfaces being communication nodes in an ad hoc wireless network; determining the locations of a first set of GPS receivers using radio signals received from GPS satellites; communicating GPS information, via the ad hoc wireless network, from one or more GPS receiver of the first set of GPS receivers to an identified GPS receiver that is unable to determine GPS parameters from GPS radio signals received from GPS satellites; and determining the locations of the identified GPS receiver using the GPS information from the one or more GPS receiver of the first set of GPS receivers.

In a sixth aspect of the invention, a selective GPS denial system includes: a plurality of GPS deniers for disrupting reliable operation of GPS receivers, wherein each of the plurality of GPS deniers may be selectively activated; a plurality of remote sensor interfaces, each remote sensor interface of the plurality of remote sensor interfaces being associated with a respective GPS denier of the plurality of GPS deniers such that each remote sensor interface effectuates the activation of a respective GPS denier, wherein the plurality of remote sensor interfaces are communication nodes in an ad hoc wireless network; a gateway, serving as a communication node in the ad hoc wireless network, that communicates instructions to one or more of the plurality of remote sensor interfaces to selectively activate the GPS denier respectively associated therewith; and a computer management system, disposed in communication with the gateway, that controls the instructions communicated by the gateway, thereby selectively controlling which GPS deniers, of the plurality of GPS deniers, are activated.

In a feature of this aspect, at least one of the GPS deniers is a GPS jammer, a GPS repeater and/or a GPS signal interruption device.

In another feature of this aspect, each GPS denier of the plurality of GPS deniers is directly associated with a respective remote sensor interface of the plurality of remote sensor interfaces. Additionally, each GPS denier and the respective remote sensor interface with which it is directly associated may be integrated into a unitary component contained within a single housing, or each GPS denier and the respective remote sensor interface with which it is directly associated may be physically separated from one another and contained in different housings. Moreover, each GPS denier and the respective remote sensor interface with which it is directly associated may be connected wirelessly, or each GPS denier and the respective remote sensor interface with which it is directly associated may be connected by way of a cabled connection.

In yet another feature of this aspect, at least one remote sensor interface of the plurality of remote sensor interfaces includes a standards based radio. Additionally, the at least one remote sensor interface includes a Wake-Up Receiver. Moreover, the Wake-Up Receiver is adapted receive a wireless wake-up signal and to activate the standards based radio in response thereto, and the gateway includes a Wake-Up Transmitter that is adapted to transmit a wireless wake-up signal to activate the standards based radio. In this regard, the gateway includes a standards based radio adapted to communicate with the standards based radio of the at least one remote sensor. Further, the standards based radio of the at least one remote sensor is adapted to communicate with the gateway via other remote sensor interfaces using hopping.

In still another feature of this aspect, the computer management system includes one or more servers. Further, at least one server may be physically co-located with the gateway, or at least one server may be a central server communicatively connected to the gateway via an external network.

In still another feature of this aspect, the system further includes a GPS receiver, associated with one of the remote sensor interfaces, for receiving radio signals from GPS satellites and determining parameters based on the signals received from the GPS satellites, the parameters including positional parameters. Further, the GPS receiver is associated with the remote sensor interface such that the remote sensor interface extracts the GPS parameters from the GPS receiver. The gateway receives the extracted GPS parameters from the remote sensor interface, and the computer management system receives the extracted GPS parameters from the gateway and compares the determined GPS parameters with historical GPS parameters for the GPS receiver to detect whether an active GPS denial device is present in the vicinity of the GPS receiver.

In a seventh aspect of the invention, a method for selective GPS denial includes: disposing at least a portion of a selective GPS denial system in an area of interest, the selective GPS denial system including (i) a plurality of remote sensor interfaces, each of which is associated with a GPS denier, that form the communication nodes in an ad hoc wireless network, and (ii) a computer management system that communicates instructions to one or more of the plurality of remote sensor interfaces to selectively activate the GPS denier respectively associated therewith; determining the location of each of the plurality of remote sensor interfaces within the area of interest; identifying one or more regions within the area of interest in which GPS denial is desired; transmitting instructions to selected ones of the plurality of remote sensor interfaces, in the identified regions, to activate the respective GPS deniers associated therewith; and at each of the selected ones of the plurality of remote sensor interfaces, in response to receiving the transmitted instructions, activating the GPS denier associated therewith, thereby causing GPS denial in the identified regions.

In a feature of this aspect, the method further includes the step of establishing a corridor of operation in which GPS parameters may be determined accurately based on the location of the identified regions.

In an eighth aspect of the invention, a tactical GPS denial/denial detection system includes: a plurality of GPS detection/denial devices, each having (i) a GPS receiver for receiving radio signals from GPS satellites and determining parameters based on the signals received from the GPS satellites, the parameters including positional parameters, (ii) a GPS denier for disrupting reliable operation of GPS receivers, wherein the GPS denier may be selectively activated, and (iii) a remote sensor interface adapted to extract the GPS parameters from the GPS receiver and to effectuate the activation of the GPS denier, (iv) wherein the plurality of remote sensor interfaces are communication nodes in an ad hoc wireless network; a gateway, serving as a communication node in the ad hoc wireless network, that receives the extracted GPS parameters from one or more of the plurality of remote sensor interfaces and that communicates instructions to one or more of the plurality of remote sensor interfaces to selectively activate the GPS denier respectively associated therewith; and a computer management system, disposed in communication with the gateway, that receives the extracted GPS parameters from the gateway and analyzes the GPS parameters to detect whether an active GPS denial device is present in the vicinity of the system, and further that controls the instructions communicated by the gateway, thereby selectively controlling which GPS deniers, of the plurality of GPS deniers, are activated.

In a ninth aspect of the invention, a method of deploying a GPS denial/denial detection system includes: deploying a plurality of a plurality of GPS detection/denial devices in an area of interest, each having (i) a GPS receiver for receiving radio signals from GPS satellites and determining parameters based on the signals received from the GPS satellites, the parameters including positional parameters, (ii) a GPS denier for disrupting reliable operation of GPS receivers, wherein the GPS denier may be selectively activated, (iii) a remote sensor interface adapted to extract the GPS parameters from the GPS receiver and to effectuate the activation of the GPS denier, (iv) wherein the plurality of remote sensor interfaces are communication nodes in an ad hoc wireless network; assessing the area of interest for adversarial GPS denial devices using the plurality of GPS receivers and the ad hoc wireless network; based on the assessment, determining a tactical operation to be carried out against at least one adversarial GPS denial device; and selectively activating, using the ad hoc wireless network, one or more of the plurality of GPS deniers based on the determined tactical operation.

In a feature of this aspect, the method further includes the step of, after carrying out the determined tactical operation, reassessing the area of interest for adversarial GPS denial devices using the plurality of GPS receivers and the ad hoc wireless network.

In another feature of this aspect, the method further includes the step of establishing a corridor of operation in which GPS parameters may be determined accurately based on the locations of the activated GPS deniers, thereby facilitating tactical operations using the established corridor.

In addition to the aforementioned aspects and features of the present invention, it should be noted that the present invention further includes the various possible combinations of such aspects and features.

VI. BRIEF DESCRIPTION OF THE DRAWINGS

One or more embodiments of the present invention will be described in detail with reference to the accompanying drawings which are briefly described below, and wherein the same elements are referred to with the same reference numerals.

VII. DETAILED DESCRIPTION

Figure 1:
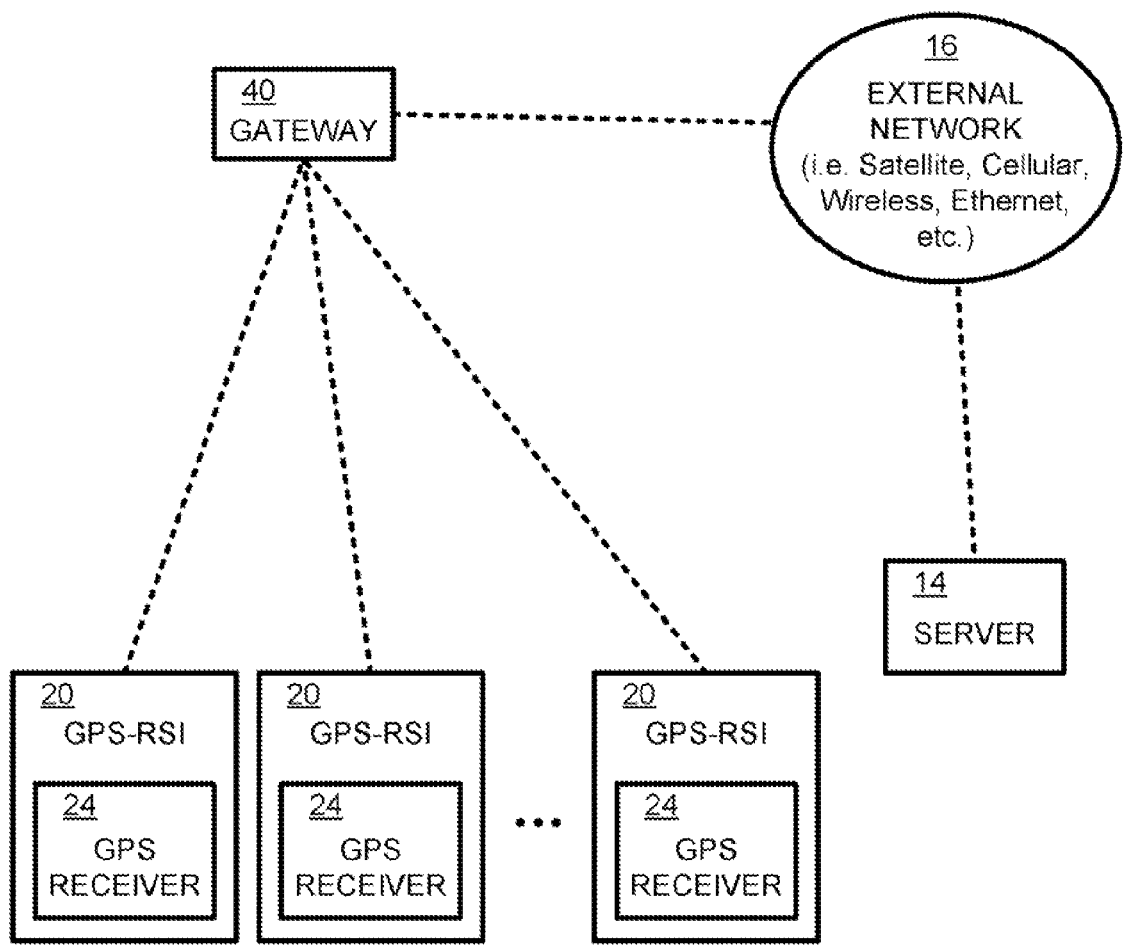
FIG. 1 is a block diagram of a GPS denier detection system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, the preferred embodiments of the present invention are next described. The following description of the preferred embodiment(s) is merely exemplary in nature and is in no way intended to limit the invention, its application, or uses.

FIG. 1 is a block diagram of a GPS denier detection system 10 in accordance with a preferred embodiment of the present invention. The detection system 10 comprises a plurality of remote sensor interfaces, each of which includes a GPS receiver integral therewith (each a "GPS-RSI") 20, at least one gateway 40, an external network 16 and a computer management system 14. The GPS-RSIs 20 and the gateway 40 each comprise a communication node in one or more ad hoc wireless networks, some of which are described further hereinbelow.

Figure 2:
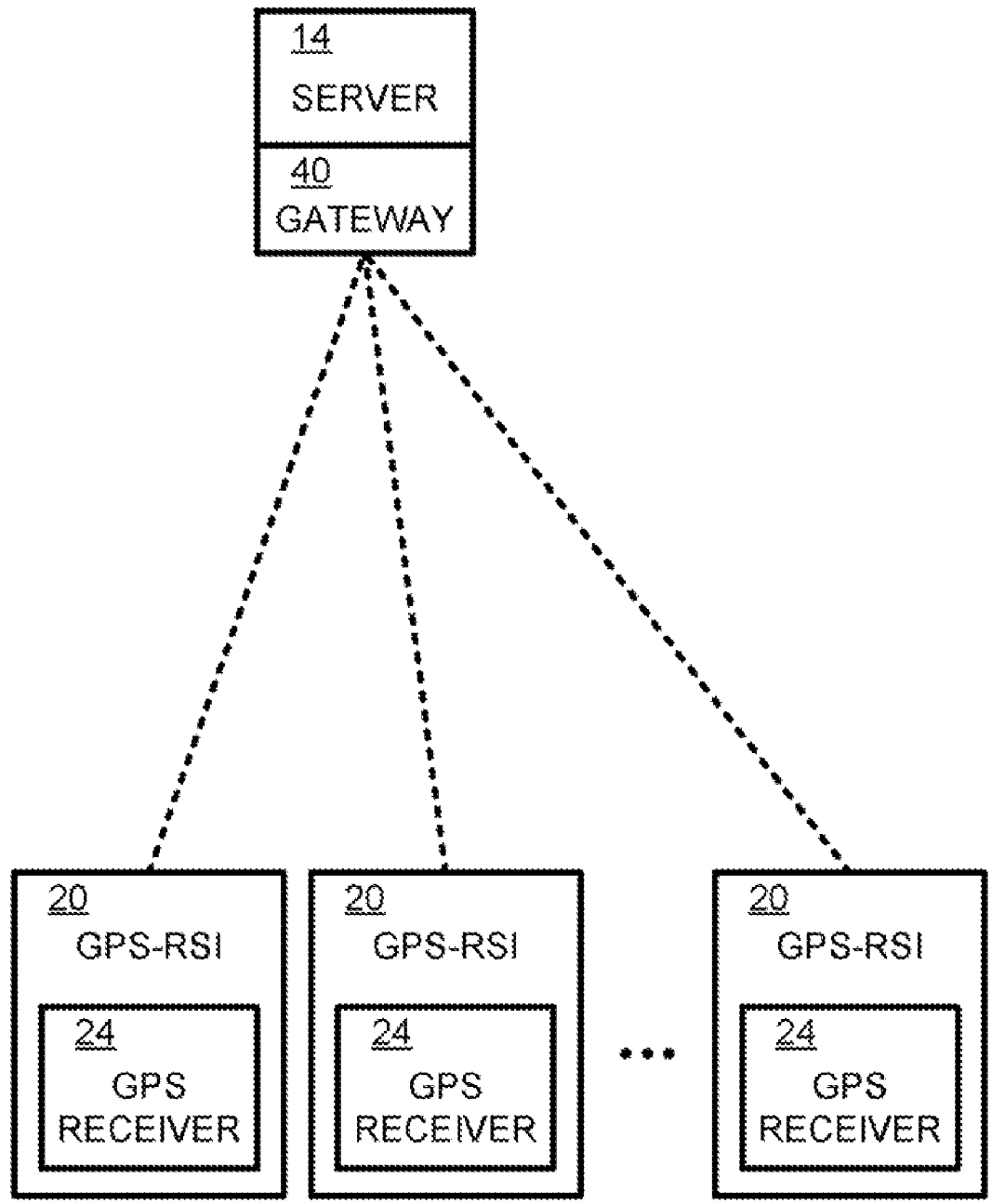
FIG. 2 is a block diagram of another GPS denier detection system.

In at least one embodiment, the computer management system 14 primarily includes a server, and although different computer management system arrangements may be utilized, all arrangements will generally be referred to hereinafter as a "server." Further, as shown in the detection system 110 of FIG. 2, the server 14 may be physically co-located with the gateway 40, thereby foregoing the need for an external network connecting the gateway 40 to the server 14. The combination of a gateway 40 with a server 14 in a unitary component is sometimes referred to as a "gateway controller."

Figure 3:
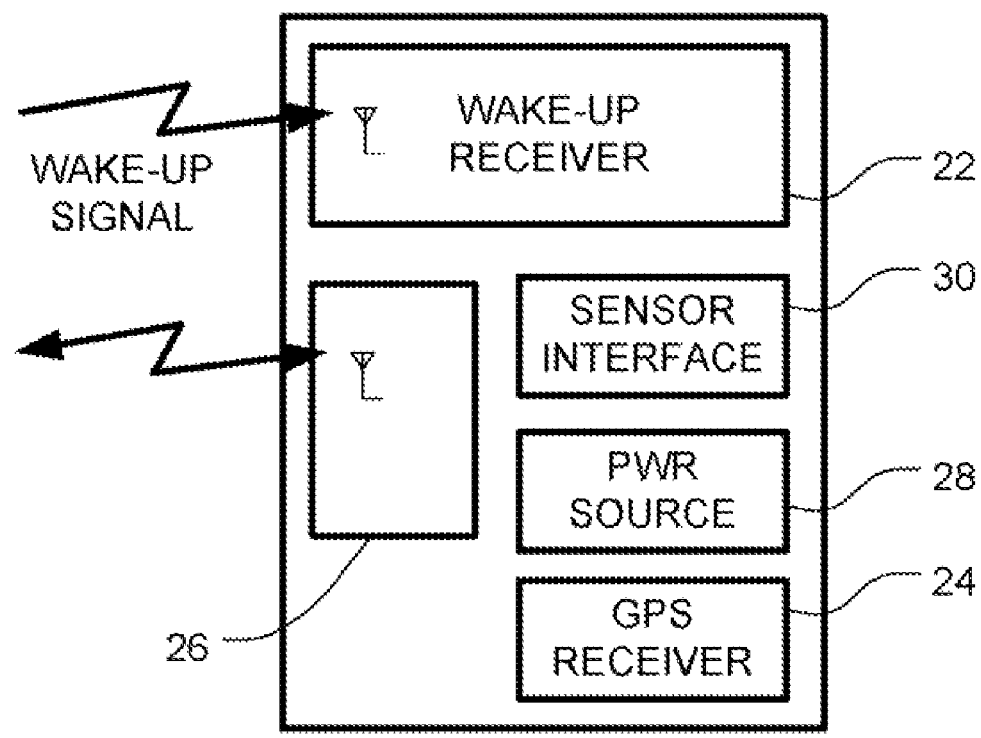
FIG. 3 is a block diagram of an exemplary GPS-RSI for use in the system of FIG. 1.
Figure 4:
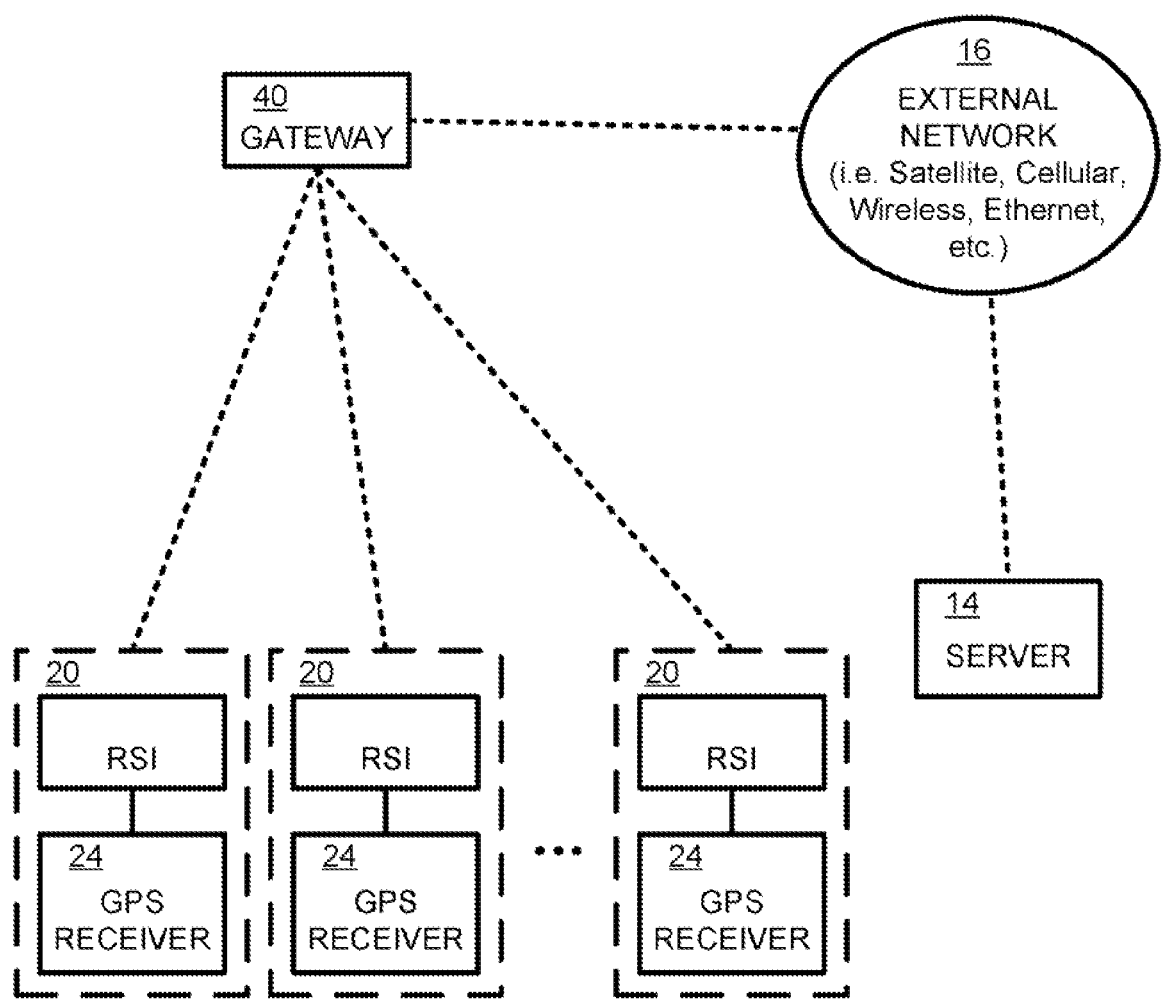
FIG. 4 is a block diagram of yet another GPS denier detection system.

Turning now to FIG. 3, a GPS-RSI 20 according to the present invention is diagrammatically shown to include: a Wake-Up Receiver 22 for receiving wireless signals, a GPS receiver 24 for calculating the position of the GPS-RSI 20 and thus the position of the individual or equipment carrying the GPS-RSI 20, a standards based radio 26 for two-way wireless communications with, for example, one or more other GPS-RSIs 20 and/or one or more gateways 40, and an electrical power source 28, such as a battery. As shown in FIGS. 1 and 3, the GPS receiver 24 is incorporated directly into the GPS-RSI 20, and as such a separate interface between the respective devices is not illustrated. Alternatively, a GPS receiver 24 may be physically separated from, but associated with, the other portions of a GPS-RSI 20, thereby providing generally similar functionality to the arrangement depicted in FIGS. 1 and 2. Such an arrangement is shown in the detection system 210 of FIG. 4. In this regard, the GPS receiver 24 and the other portions of the GPS-RSI 20 may be contained in separate housings, and electronic communication between the GPS receiver 24 and the other portions of the GPS-RSI 20 are exchanged wirelessly in some embodiments of the invention and by way of a cabled connection in other embodiments.

Optionally, the GPS-RSI 20 may further include a sensor interface 30 for acquiring data from one or more sensors associated with the GPS-RSI 20. Insofar as the GPS-RSI 20 is associated with military equipment and personnel assets, such individual soldiers, operational units or vehicles or other equipment carrying or supporting personnel or equipment, the GPS-RSI 20 preferably is capable of interfacing with sensors that, for example, monitor the assets, environmental characteristics of the assets, and/or geographical locations of the assets. In some embodiments, such sensors may actually be included within the GPS-RSI 20; in other embodiments, such sensors may be external to the GPS-RSI 20 but nevertheless disposed in electronic communication with the sensor interface for data exchange therebetween. Electronic communication between the sensor interface and a sensor is exchanged wirelessly in some embodiments of the invention and by way of a cabled connection in other embodiments. In at least one embodiment, the sensor interface comprises a multi-conductor connector, such as a ribbon cable, that passes from the interior of an GPS-RSI 20 and to an external sensor, sensor array, or docking station that receives the GPS-RSI 20. Exemplary sensors include, but are not limited to, electronic seals, magnetic seals, cameras, microphones, temperature sensors, humidity sensors, radiation sensors, and motion sensors.

In order to reduce unnecessary power consumption, the standards based radio 26, which has a relatively high power consumption rate when active, is generally dormant until awakened. The Wake-Up Receiver 22, which has a relatively low power consumption rate compared to that of the standards based radio 26, generally remains active for detecting incoming wireless wake-up signals. Upon receipt of a wake-up signal intended for the GPS-RSI 20, the Wake-Up Receiver 22 generally wakes-up the standards based radio 26 for receiving and transmitting data via the standards based radio 26. Those components of the GPS-RSI 20 that consume relatively high amounts of power thereby are generally active only when needed.

The Wake-up Receiver 22 includes components for receiving wireless wake-up signals. The Wake-Up Receiver 22 is generally similar in function to the "WT Component" described in detail, for example, in incorporated International Patent Application Publication No. WO 03/098851 A1 (and which international application entered the U.S. national phase and published as U.S. Patent Application Publication No. US 2005/0215280, also incorporated herein by reference). The Wake-Up Receiver 22 moreover has been occasionally referred to as a "tag turn-on circuit," a "TTOC" or a "Wake-Up Rx." The process for determining whether to wake-up the standards based radio of the GPS-RSI 20 furthermore may include a number of steps that are performed in a particular sequence, especially if the GPS-RSI 20 is disposed in a noisy radio-frequency (RF) environment. For example, such a wake-up sequence is described in the disclosure of U.S. patent application Ser. No. 11/421,321, which published as U.S. Patent Application Publication No. 2006/0269633, each of which is hereby incorporated herein by reference.

Reduction in unnecessary power consumption may also be achieved by utilizing common designation ad hoc networks such as, for example, class-based networks. Common designation networking is disclosed, for example, in U.S. patent application Ser. No. 11/161,539, which published as U.S. Patent Application Publication No. 2006/0023678 A1, each of which is hereby incorporated herein by reference.

Figure 5:
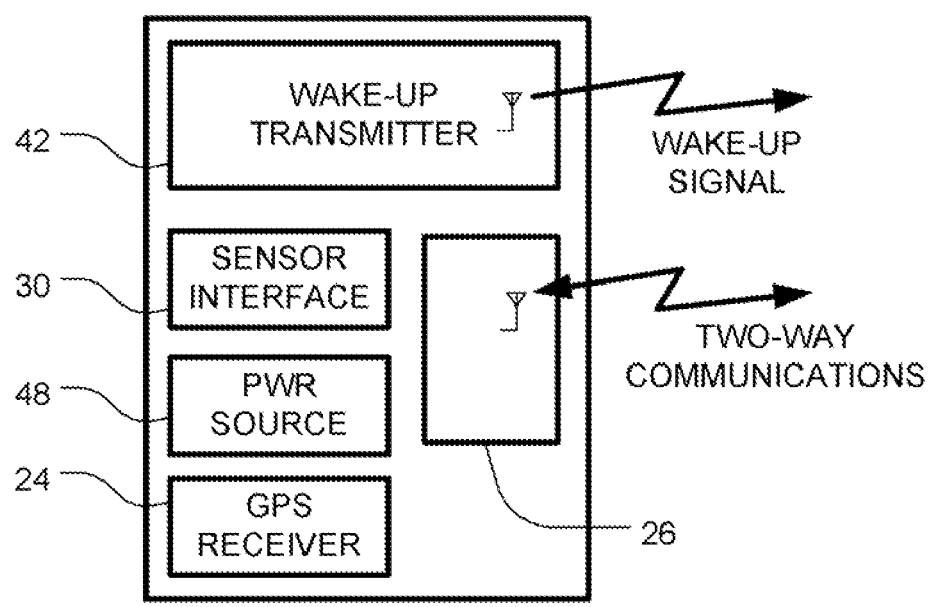
FIG. 5 is a block diagram of an exemplary gateway for use in the system of FIG. 1.

Turning now to FIG. 5, a gateway 40 may include: a Wake-Up Transmitter 42 for transmitting wireless signals, a standards based radio 26 for two-way wireless communications with one or more GPS-RSIs 20 and/or one or more other gateways 40, and an electrical power source 48, such as a battery. The gateway 40 may also include a GPS receiver 24 for calculating the position of the gateway 40 and/or a sensor interface 30 for acquiring data from one or more sensors associated with the gateway 40.

The Wake-Up Transmitter 42 includes components for transmitting wireless wake-up signals. The Wake-Up Transmitter 42 has occasionally been referred to as a "tag turn-on," a "TTO" or a "Wake-Up Tx," and the Wake-Up Transmitter 42 is capable of sending signals to Wake-Up Receivers 22, TTOCs, or the like, for wake-up of GPS-RSIs 20. In at least one other embodiment (not shown), a gateway may include a Wake-Up Receiver 22 like those included in the GPS-RSIs 20, either in place of or in addition to the Wake-Up Transmitter. In this embodiment, the Wake-Up Transmitter is further capable of sending signals to gateways 40.

The gateway 40 facilitates communication between one or more wireless networks, formed using the gateway 40 and one or more of the GPS-RSIs 20 as communication nodes, and the external network 16. As such the gateway 40 further includes one or more appropriate connections for communicating with such an external network 16, such connection including but not limited to a network interface for mobile phone, WiFi, two-way radio, secure radio links, Ethernet, and/or satellite communications. Each gateway 40 thus serves as an access point for communications with the external network 16. Electronic communication between the network interface and the external network 16 may be exchanged wirelessly in some embodiments of the invention and by way of a cabled connection in other embodiments.

The external network 16 may include wired or wireless communications using any of the foregoing technologies or combination thereof, as well as any other appropriate communication technologies. Additionally, the external network 16 may incorporate use of the Internet or some other wide area network.

The GPS-RSIs 20 are programmed to communicate directly with the gateway 40 or to communicate via hopping. Because the GPS-RSIs 20 can hop between one another to reach a gateway 40, fewer gateways 40 are needed to cover an area. The gateway 40 communicates with the server 14, which is disposed on and/or connected to the external network 16.

The server 14 is responsible for numerous functions in detecting the presence of a GPS denial device. For example, as described below, the server 14 extracts GPS parameters from each GPS-RSI 20 and compares such extracted parameters with historical parameters. The server 14 also acts as an application interface and provides control for the GPS receivers 24 and any other sensors communicatively connected to a GPS-RSI 20 via sensor interface 30.

Some of the components of the detector system 10 are disclosed in further detail in the incorporated references. In at least some embodiments, the present invention relates to use of such components in implementations involving GPS denier detection and/or selective GPS jamming.

Advantageously, the system of FIG. 1 has the ability to determine or detect whether a GPS denial device is present so that it can be identified and knocked out by military action and has the ability to find a GPS denial device based on the effect that it is having on multiple GPS receivers disposed in a particular area.

An RSI with an associated GPS receiver is relatively inexpensive and may be housed within a relatively small form factor. Accordingly, such RSI-GPS receiver combinations may be deployed on a large scale due to the relatively low expense and size of the combination. Further, the small size renders the combination relatively inconspicuous and easily disguisable, which is particularly advantageous in military applications.

Figure 6:
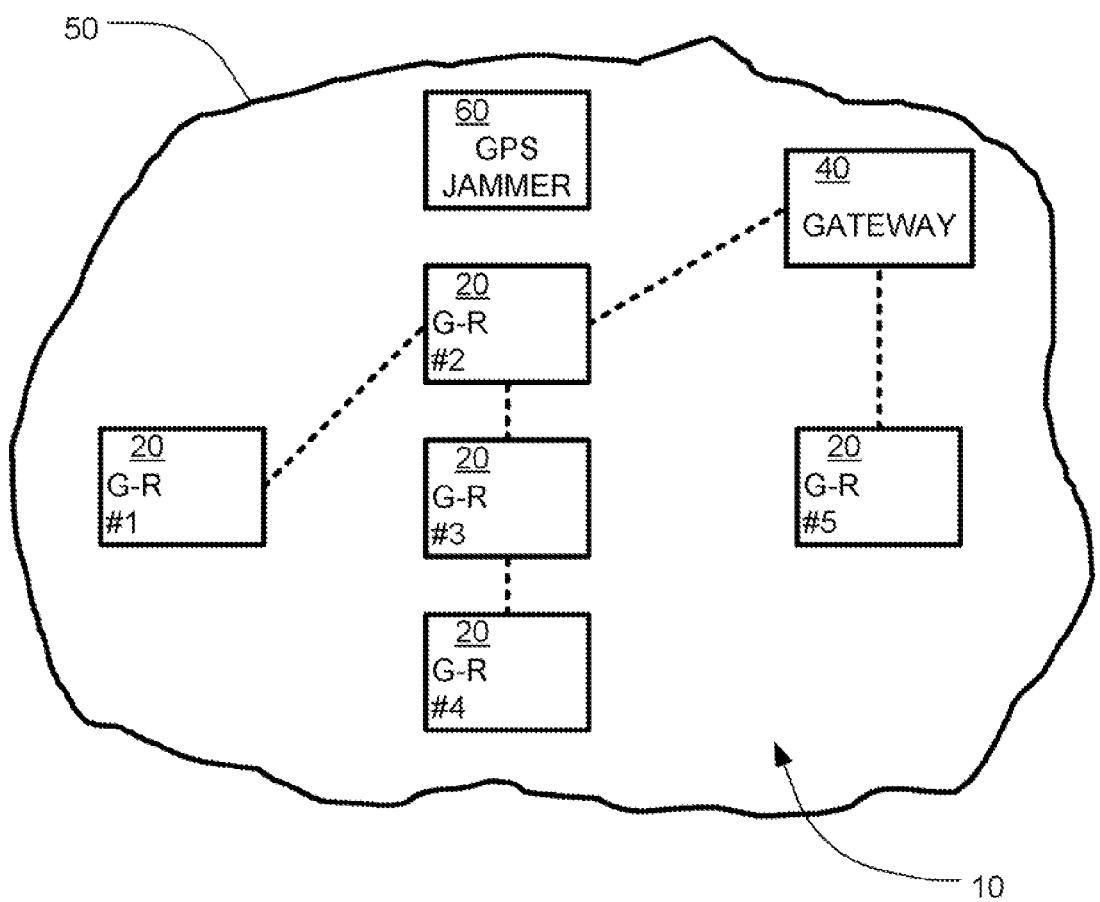
FIG. 6 illustrates a first operational mode in which a detection system is used to detect the presence of a GPS denial device in an area of interest.

FIGS. 6-9 are block diagrams of detector systems in accordance with multiple preferred operational modes of a system of the present invention. For example, FIG. 6 illustrates a first operational mode in which a detection system 10 is used to detect the presence of a GPS denial device 60 in an area of interest 50. In the first operational mode, the detection system 10 once again comprises a plurality of GPS-RSIs 20, a gateway 40, an external network (not shown) and a server (not shown). As shown, the GPS-RSIs 20 and the gateway 40 are the communication nodes of an ad hoc wireless network.

In operation, the system of FIG. 6 is able to detect the presence of the GPS denial device 60 as follows. On an ongoing basis, the GPS receivers 24 accept GPS radio signals from GPS satellites (not shown). Based on such signals, the GPS receivers 24 determine positional parameters such as latitude, longitude, and altitude. GPS receivers 24 may also determine, or be used to determine, parameters such as signal velocity, signal strength, satellites in view, and various other information related to received GPS radio signals. A microprocessor or the like (not shown) in each GPS-RSI 20 extracts the available parameters from the GPS receiver 24 associated therewith and the GPS-RSI 20 uses its standards based radio 26 to communicate the parameters to the server 14 via the gateway 40 and external network 16. If the GPS-RSI 20 is unable to communicate directly with the gateway 40, conventional hopping techniques may be used to communicate the parameters to the gateway 40 via one or more intermediate GPS-RSIs 20. As the server 14 receives GPS parameters from the GPS receivers 24 of the various GPS-RSIs 20, a software application stores the parameters in an appropriate location and format for later retrieval and examination.

GPS parameter data is preferably gathered on a regular basis, with the frequency being selected on the basis of one or more factors, such as accuracy, speed, bandwidth, data capacity, and the like. In the preferred embodiment, GPS parameter data is gathered at a frequency controlled by the server 14 using the Wake-Up Transmitters 42 and Wake-Up Receivers 22 to awaken the various GPS-RSIs 20 as desired. More specifically, when the server 14 (or the software application being executed thereon) determines that it is time to receive GPS parameter data from the GPS receiver 24 of a GPS-RSI 20, the server 14 may control one or more gateways 40 to transmit, via their respective Wake-Up Transmitters 42, a wake-up signal appropriate to awaken the GPS-RSI 20. Such signals may be tailored to awaken a particular GPS-RSI 20, all GPS-RSIs 20 in a wireless network, or any subset thereof, as desired. Upon receiving such a wake-up signal, the Wake-Up Receiver 22 of the GPS-RSI 20 causes the GPS receiver 24 and the standards based radio 26 to awaken, and the GPS receiver 24 is set into listening mode. After a sufficient duration has passed for the GPS receiver 24 to gather radio signal information, the desired parameters are read out of the GPS receiver 24 and transmitted by the standards based radio 26 for relay back to the server 14 for analysis.

If the gateway 40 is equipped with its own GPS receiver 24, then GPS parameters from the gateway GPS receiver 24 may likewise be gathered and relayed back to the server 14. In this regard, it may be desirable for the gateway 40 to be likewise equipped with a Wake-Up Receiver 22 in order to conserve power or to simplify operation of the system 10.

Optionally, other techniques or criteria may be used to awaken a GPS-RSI 20 or gateway 40. For example, other devices, such as a real-time clocks, or sensor triggers such as those based on motion, temperature, or humidity and optionally gathered via the sensor interface 30, can also awaken the GPS-RSIs 20. Notably, with the wake-up technologies described above, radio standby time and receive mode currents no longer drive battery requirements. Further, battery power is actually conserved because the GPS-RSI 20 has the ability to enable event-driven monitoring of GPS receivers 24.

Parameters extracted from the receivers 24 at any particular time can be compared to previously extracted, historical parameters, which are stored at the server, to deduce whether a jammer 60 is present. More specifically, algorithms may be used to determine when newly-received GPS parameter data is likely corrupted by the operation of a nearby GPS denial device 60. If the server 14 determines that a GPS denial device 60 appears to be present in the vicinity of a GPS-RSI 20, appropriate information may be relayed back to the GPS-RSI 20, to one or more other GPS-RSIs 20, to other nearby equipment (not shown), or in any other way appropriate for notifying the equipment and/or a user as to the presence of a GPS denial device 60 operating nearby. In addition, or alternatively, appropriate information may be relayed to unrelated personnel or equipment in any location. For example, in military operations, if a GPS denial device 60 is discovered, it may be desirable to order an air strike targeting the GPS denial device 60.

Figure 7:
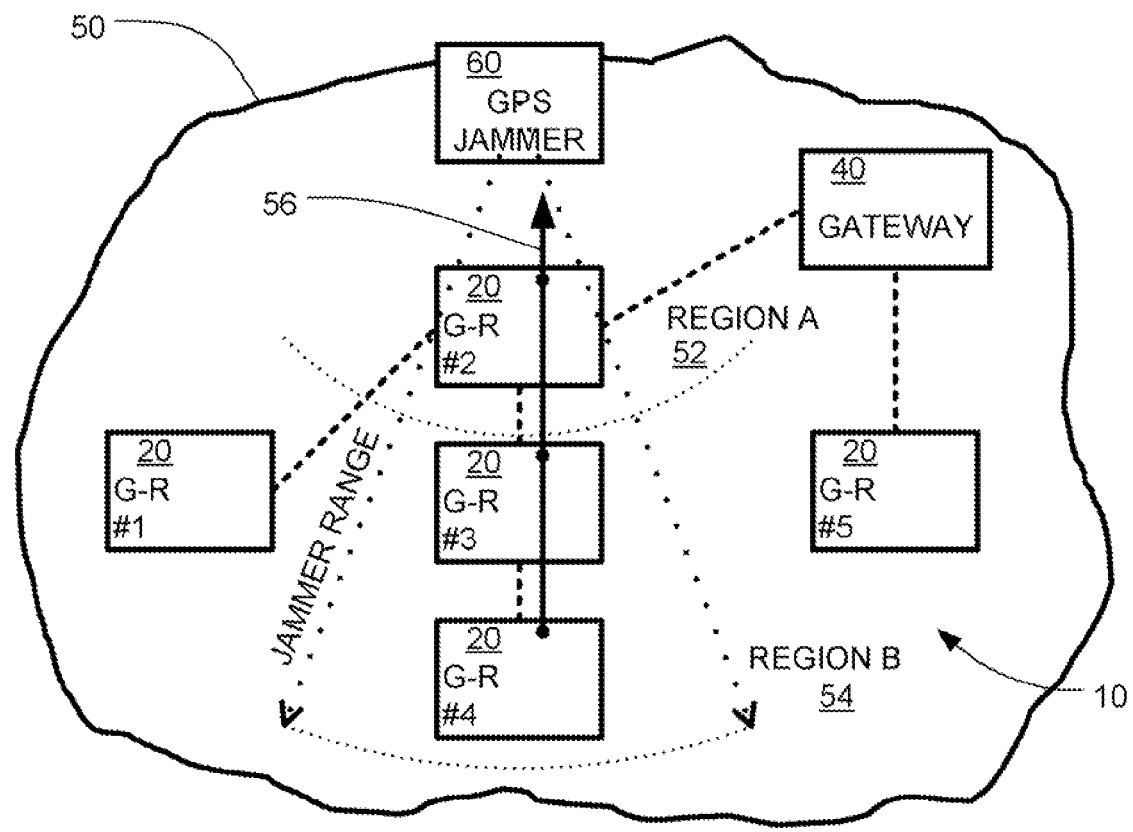
FIG. 7 illustrates a second operational mode in which a detection system is used to detect the presence of a GPS denial device in an area of interest.

FIG. 7 illustrates a second operational mode in which a detection system 10 is used to detect the direction of a GPS denial device 60 in an area of interest 50. In the second operational mode, the detection system 10 once again comprises a plurality of GPS-RSIs 20, a gateway 40, an external network (not shown) and a server (not shown), and as shown, the GPS-RSIs 20 and the gateway 40 are the communication nodes of an ad hoc wireless network.

GPS denial devices 60 tend to be directional, so information about the status of GPS receivers 24 and their relative positions can be used to determine the location of a GPS denial device 60. More particularly, the difficulty encountered by the GPS receiver 24 in calculating an accurate position may be used as a rough indicator of the proximity of a GPS denial device 60. For example, if the server 14 determines, based on a comparison of current GPS parameter data to historical GPS parameter data, that a GPS receiver 24 is denied or prevented from calculating a position altogether, the likelihood of a GPS denial device 60 being relatively near that GPS-RSI 20 is high. If the server 14 determines that a GPS receiver 24 is able to calculate a partial position or a position close to its previously-determined, historical, position, the GPS receiver 24 is likely farther away from the GPS denial device 60.

In this regard, FIG. 7 illustrates a first region ("Region A") 52, defined generally as a region in which GPS receivers 24 is denied or prevented from calculating a position altogether, and a second region ("Region B") 54, defined generally as a region in which GPS receivers 24 are able to calculate at least a partial position but for which the calculation is adversely affected by a GPS denial device 60. The GPS-RSI 20 labeled "G-R #2" is shown to be disposed in Region A 52, while the GPS-RSIs 20 labeled "G-R #3" and "G-R #4" are shown to be disposed in Region B 54.

Using this phenomenon, recent positional parameters can thus be compared to previously determined positional parameters to determine the general direction of a GPS denial device 60. More specifically, the general direction of a GPS denial device 60 may be visualized by drawing an imaginary arrow 56 starting from a GPS receiver 24 with a partially erroneous position (such as "G-R #3" and "G-R #4") and drawn through to a GPS receiver 24 (such as "G-R #2") that is denied a position calculation altogether. Such an arrow 56 points generally in the direction of the GPS denial device 60. Other GPS parameters can be studied to determine likely proximity of a GPS receiver 24 relative to a GPS denial device 60, thereby providing a distance estimate in addition to a directional estimate. Similar techniques can be used if the radio receiver is something other than a GPS receiver 24.

Figure 8:
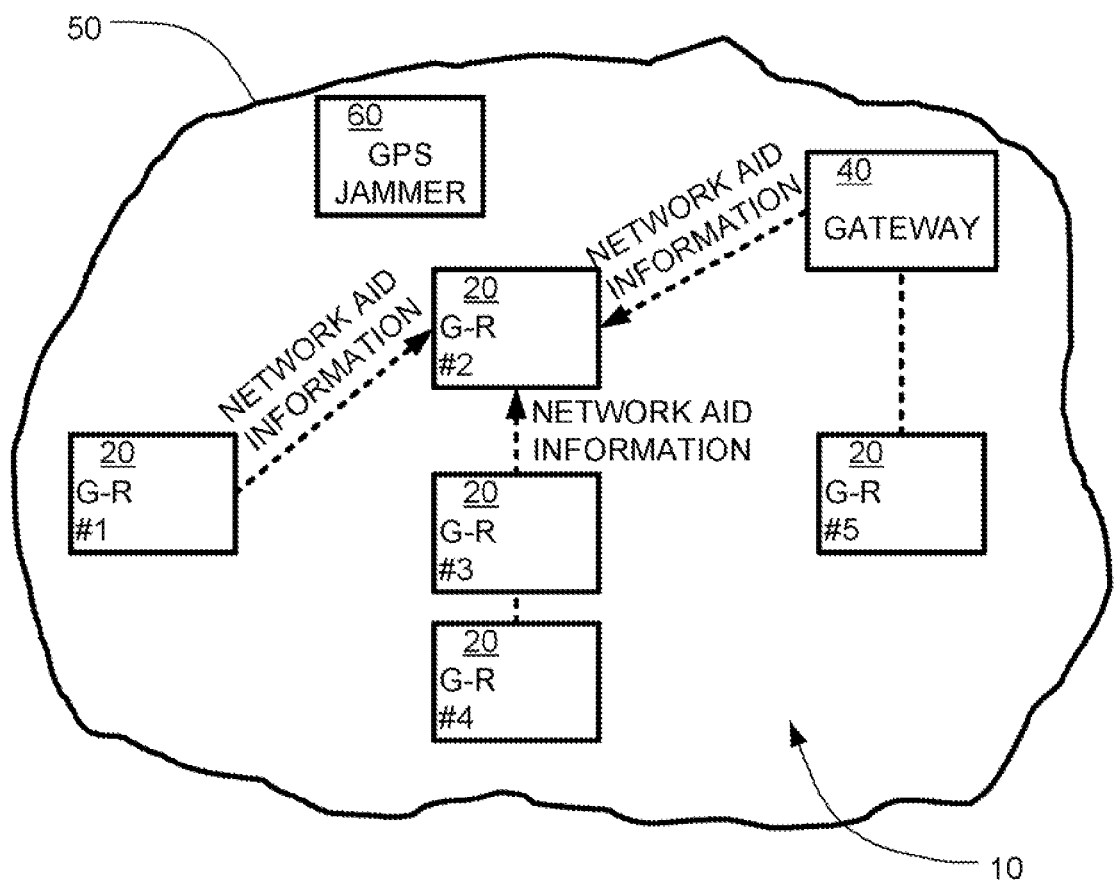
FIG. 8 illustrates a third operational mode in which a detection system is used to detect the presence or direction of a GPS denial device, in an area of interest, utilizing network assistance in calculating GPS parameters.

FIG. 8 illustrates a third operational mode in which a detection system 10 is used to detect the presence or direction of a GPS denial device 60, in an area of interest 50, utilizing network assistance in calculating GPS parameters. Such an operational mode may be useful in certain environments, such as urban environments, jungle canopy, mountainous regions and high multi-path environments, in which standard GPS receivers 24 frequently have difficulty generating accurate GPS parameters independently.

In this operational mode, the detection system 10 once again comprises a plurality of GPS-RSIs 20, a gateway 40, an external network (not shown) and a server (not shown), and as shown, the GPS-RSIs 20 and the gateway 40 are the communication nodes of an ad hoc wireless network. Pertinent information such as Ephemeris, Almanac, GPS time, approximate location, satellites that should be in view, and the like is determined by a GPS receiver 24 known to be reliable, such as a GPS receiver 24 located at a gateway 40 known to be uncompromised and uncorrupted, and/or provided by the server 14. Using the standards based radios 26 on the respective devices, the information thus developed is then downloaded from the gateway 40 to the GPS-RSI 20 that is encountering difficulty in determining GPS parameters accurately.

Using the downloaded information, the GPS receiver 24 may then be able to calculate its position and other GPS parameters accurately without relying solely on the GPS radio signals it receives from the GPS system. If so, then the GPS parameters may be relayed back to the server 14 as described previously, and using the newly-calculated GPS parameters as historic data, the GPS receiver 24 may then be restarted to determine the effects, if any, of a GPS denial device 60.

Figure 9:
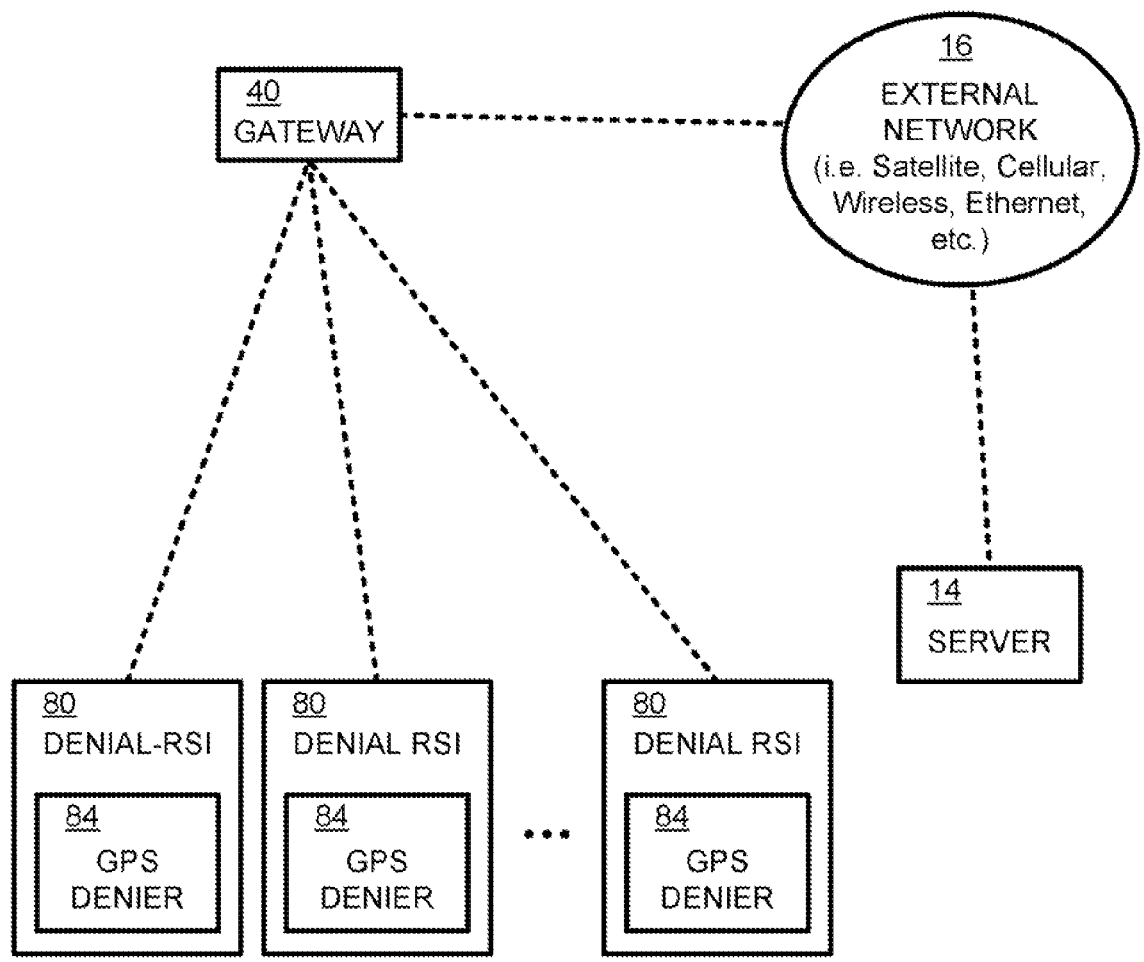
FIG. 9 is a block diagram of a GPS denial system in accordance with another alternative preferred embodiment of the present invention.

FIG. 9 is a block diagram of a GPS denial system 70 in accordance with a preferred embodiment of the present invention. The detection system 70 comprises a plurality of remote sensor interfaces, each of which includes a GPS denier 84 integral therewith (each a "denial RSI") 80, at least one gateway 90, an external network 16 and a computer management system 14. The denial RSIs 80 and the gateway 90 each comprise a communication node in one or more ad hoc wireless networks, some of which are described further hereinbelow.

The computer management system or server 14 and external network 16 may be similar to those of FIG. 1, described above, except that the computer management system (again referred to generally as a "server") 14 has different or additional functionality as described below. Also, as with the system 10 of FIG. 1, the server 14 may be physically co-located with the gateway 90, thereby foregoing the need for the external network, and the combination of a gateway 90 with a server 14 in a unitary component is sometimes referred to as a "gateway controller."

Figure 10:
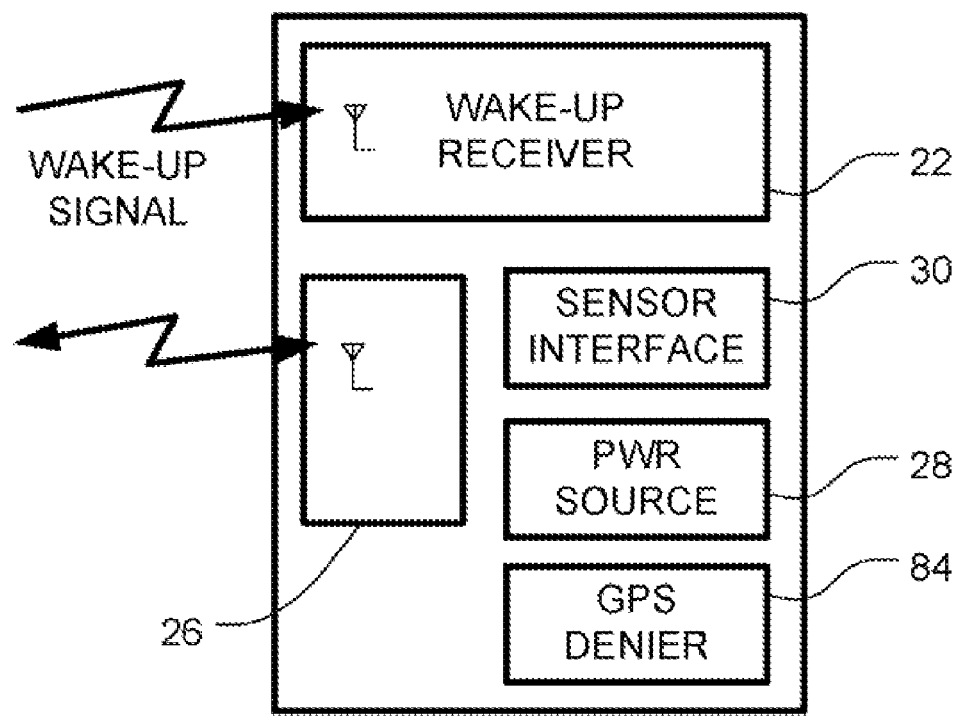
FIG. 10 is a block diagram of an exemplary denial RSI for use in the system of FIG. 9.
Figure 11:
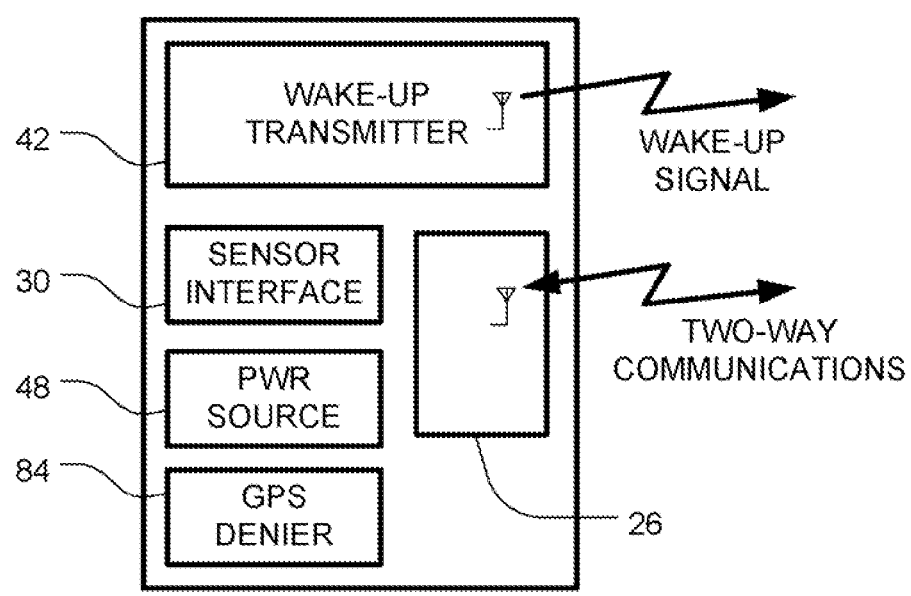
FIG. 11 is a block diagram of an exemplary gateway for use in the system of FIG. 9.

Turning now to FIG. 10, a denial RSI 80 according to the present invention is diagrammatically shown to include: a Wake-Up Receiver 22 for receiving wireless signals, a GPS denier 84 for jamming enemy GPS receivers (not shown), a standards based radio 26 for two-way wireless communications with, for example, one or more other denial RSIs 80 and/or one or more gateways 90, and an electrical power source 28, such as a battery. As shown in FIGS. 10 and 11, the GPS denier 84 is incorporated directly into the denial RSI 80, and as such a separate interface between the respective devices is not illustrated. Although not shown, a GPS denier 84 alternatively may be physically separated from, but associated with, the other portions of a denial RSI 80, thereby providing generally similar functionality to the arrangement depicted in FIG. 10. In this regard, the GPS denier 84 and the other portions of the denial RSI 80 may be contained in separate housings, and electronic communication between the GPS denier 84 and the other portions of the denial RSI 80 are exchanged wirelessly in some embodiments of the invention and by way of a cabled connection in other embodiments.

As with the GPS-RSI 20, the denial RSI 80 may further include a sensor interface 30 for acquiring data from one or more sensors associated with the denial RSI 80. The sensor interface 30 is similar to, and provides similar functionality as, the sensor interface 30 of the GPS-RSI 20. The standards based radio 26 and Wake-Up Receiver 22 are also similar to those of the GPS-RSI 20, and like the GPS-RSI 20, reduction in unnecessary power consumption may also be achieved by utilizing common designation ad hoc networks such as, for example, class-based networks.

Turning now to FIG. 11, a gateway 90 may include: a Wake-Up Transmitter 42 for transmitting wireless signals, a standards based radio 26 for two-way wireless communications with one or more denial RSIs 80 and/or one or more other gateways 90, and an electrical power source 48, such as a battery. The gateway 90 may also include a GPS denier 84 for jamming enemy GPS receivers and/or a sensor interface 30 for acquiring data from one or more sensors associated with the gateway 90. Other than the GPS denier 84, the components of the gateway 90 may be generally similar to the corresponding components of the gateway 40 of FIG. 5.

In like manner to the gateway 40 of FIG. 5, the gateway 90 of FIG. 11 facilitates communication between one or more wireless networks, in this case formed using the gateway 90 and one or more of the denial RSIs 80 as communication nodes, and the external network 16. As such the gateway 90 once again further includes one or more appropriate connections for communicating with such an external network 16, such connection including but not limited to a network interface for mobile phone, WiFi, two-way radio, secure radio links, Ethernet, and/or satellite communications. Like the gateway of FIG. 5, each gateway 90 thus serves as an access point for communications with the external network 16. Electronic communication between the network interface and the external network 16 may once again be exchanged wirelessly in some embodiments of the invention and by way of a cabled connection in other embodiments.

The denial RSIs 80 are programmed to communicate directly with the gateway 90 or to communicate via hopping. Because the denial RSIs 80 can hop between one another to reach a gateway 90, fewer gateways 90 are needed to cover an area. The gateway 90 communicates with the server 14, which in at least one embodiment is disposed on and/or connected to the external network 16, and in at least another embodiment is physically co-located with the gateway 90 as stated previously.

The server 14 is responsible for numerous functions in controlling the operation of the GPS deniers 84. For example, as described below, the server 14 may send messages or signals to the gateway 90, or to the denial RSIs 80 via the gateway 90, to activate or deactivate one or more of the respective GPS deniers 84. In this regard, common designation networks may be utilized to control one GPS denier 84 or gateway 90, all the GPS deniers 84 and gateways 90, or any subset thereof. The server 14 may also track location information about the respective denial RSIs 80 and/or gateway 90, thereby facilitating the localized use of the respective GPS deniers 84 as desired. In this regard, GPS parameters may be used to track the location of the denial RSIs 80 and gateway 90. Such GPS parameters may be developed, for example, but not limited to, through the use of GPS receivers located at or near the denial RSIs 80 and/or gateway 90. In this regard, GPS receivers such as the GPS receivers 24 described above may be associated with the respective denial RSIs 80 as described hereinbelow.

Figure 12:
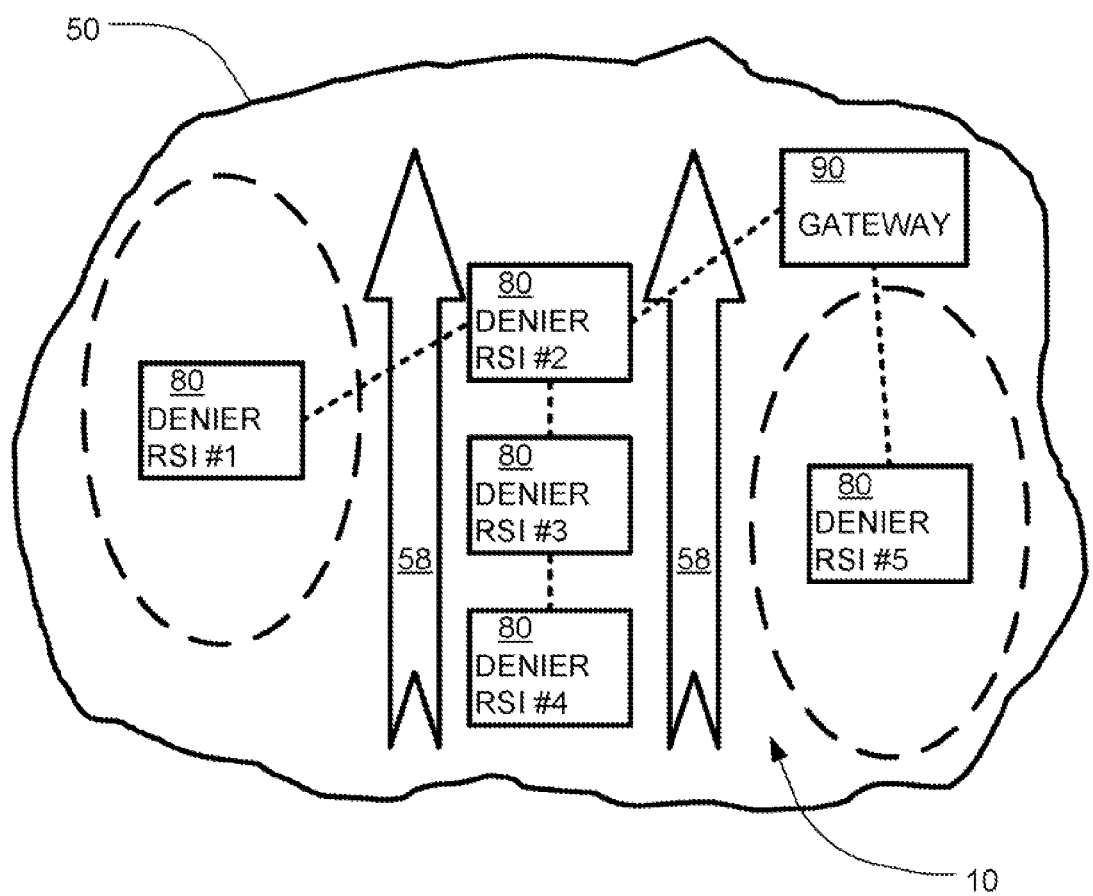
FIG. 12 illustrates a fourth operational mode in which a GPS denier system is used to control selected GPS denier RSIs.

FIG. 12 illustrates a fourth operational mode in which a GPS denier system 70 is used to control selected denier RSIs 80 so as to create a corridor of reliable GPS operation, in an area of interest 50, that is free from the effects of friendly GPS deniers 84. In the fourth operational mode, the detection system 70 once again comprises a plurality of denier RSIs 80, a gateway 90, an external network (not shown) and a server (not shown), and as shown, the denier RSIs 80 and the gateway 90 are the communication nodes of an ad hoc wireless network.

In FIG. 12, the denier RSIs 80 labeled "DENIER-RSI #1" and "DENIER-RSI #5" are shown to have active GPS deniers 84, while the remaining denier RSIs 80 are shown in thave inactive GPS deniers 84. As such, a corridor of reliable GPS operation, represented generally by arrows 58, is shown to exist in the region between the respective ranges of operation of "DENIER-RSI #1" and "DENIER-RSI #5." Localized GPS denial is thus provided in the regions around "DENIER-RSI #1" and "DENIER-RSI #5" while troop movement, such as in the direction of the arrows 58, is permitted through the corridor, without GPS receivers carried by such troops being affected by those deniers 84. As stated previously, the selection of particular denial RSIs 80 to be activated or deactivated may be controlled by the server 14, and the locations of the denial RSIs 80 are preferably tracked by the server 14 so as to provide useful locational information to friendly parties as appropriate.

Significantly, one or more aspects of a GPS detection system 20 and a GPS denier system 70 may be combined in a single GPS detection and denial management system 110, as represented in FIGS. 13-17. Optionally, but not necessarily, such a system 110 may make use of combined GPS detection/denial RSIs 120 and/or combined GPS detection/denial-equipped gateways 140. Combined GPS detection/denial RSIs 120 include both a GPS receiver 24 and a GPS denier 84, as those components are described previously, and combined GPS detection/denial-equipped gateways 140 likewise include both a GPS receiver 24 and a GPS denier 84, wherein the respective GPS receiver 24 and a GPS denier 84 may be operated independently, preferably under the control of a server 14. Furthermore, such a system 110 may include multiple gateways 40, 90, 140, each of which may be connected to the server 14 via an external network 16.

Figure 13:
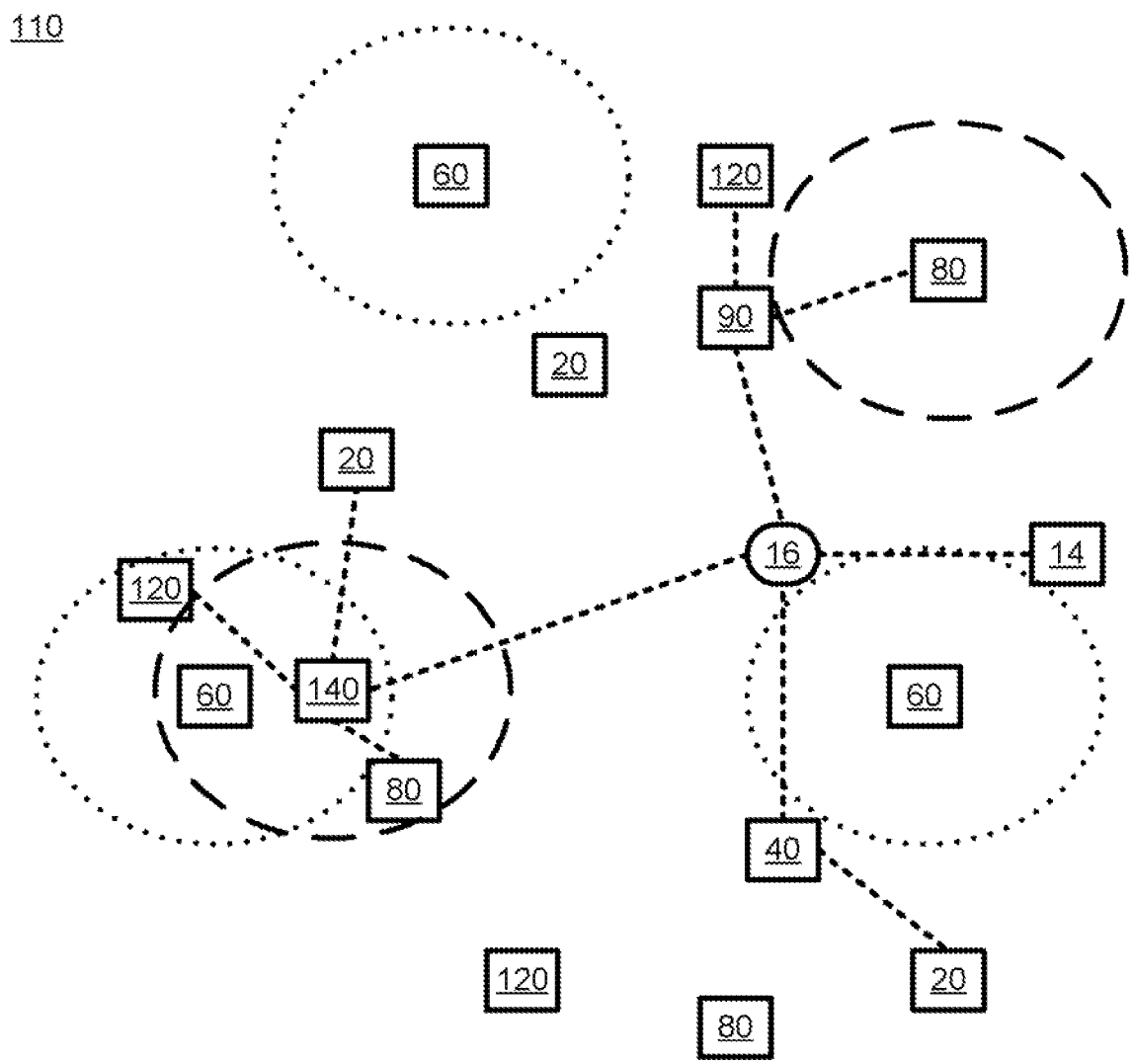
FIGS. 13 and 14 are block diagrams of a combined GPS detection/denial management system in accordance with another preferred embodiment of the present invention.
Figure 14:
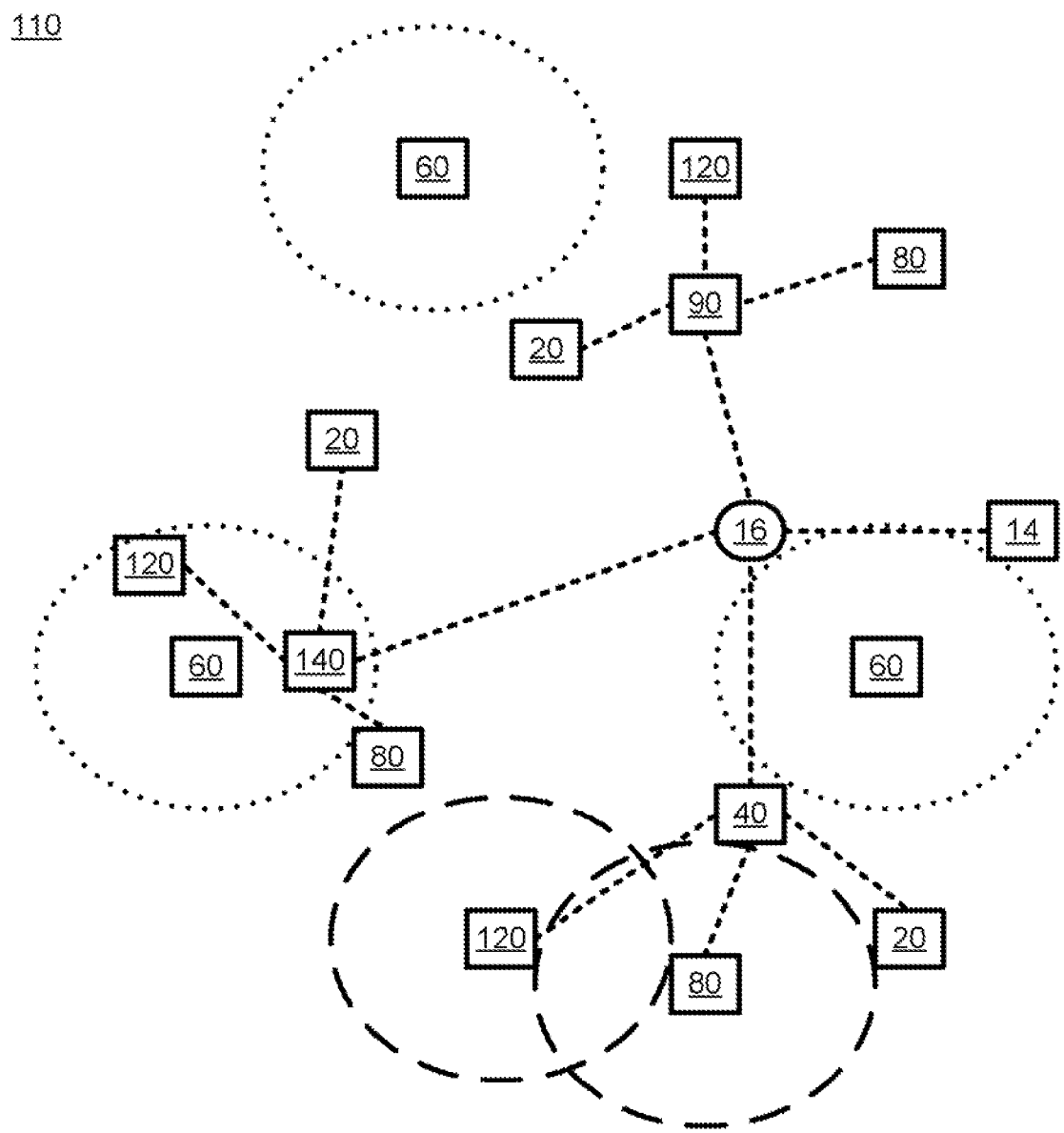

FIGS. 13 and 14 are block diagrams of a combined GPS detection/denial management system 120 in accordance with another preferred embodiment of the present invention. More particularly, FIG. 13 illustrates a fifth operational mode in which GPS-equipped RSIs 20, 120 and GPS-equipped gateways 40, 140 form ad hoc wireless networks that are separate from ad hoc wireless networks formed by GPS denier-equipped RSIs 80, 120 and GPS denier-equipped gateways 90, 140, while FIG. 14 illustrates a sixth operational mode in which ad hoc wireless networks are formed that include GPS-equipped RSIs 20, 120, GPS denier-equipped RSIs 80, 120, GPS-equipped gateways 40, 140 and GPS denier-equipped gateways 90, 140. In each operational mode, it is assumed that one or more enemy GPS denial devices 60 are operating in the vicinity of the system 120. In FIG. 13, the combined GPS detection/denial-equipped gateway 140 and a first of the GPS denier-equipped RSIs 80 have been activated, while in FIG. 14, the combined GPS detection/denial-equipped gateway 140 and the first GPS denier-equipped RSI 80 have been deactivated, while a second GPS denier-equipped RSI 80 and the combined GPS detection/denial RSI 120 have been activated.

Notably, communications between the various devices 20, 40, 80, 90, 120, 140 are maintained, via their respective standards based radios 26, regardless of whether the respective associated GPS receivers 24 are being jammed or otherwise disrupted. Further, it will be appreciated that in at least one embodiment, the fifth and sixth operational modes are merely variations of the same operational mode, wherein the types of devices that are included in a particular ad hoc network may be controlled using different designations in a common designation ad hoc network, as described previously.

Figure 15:
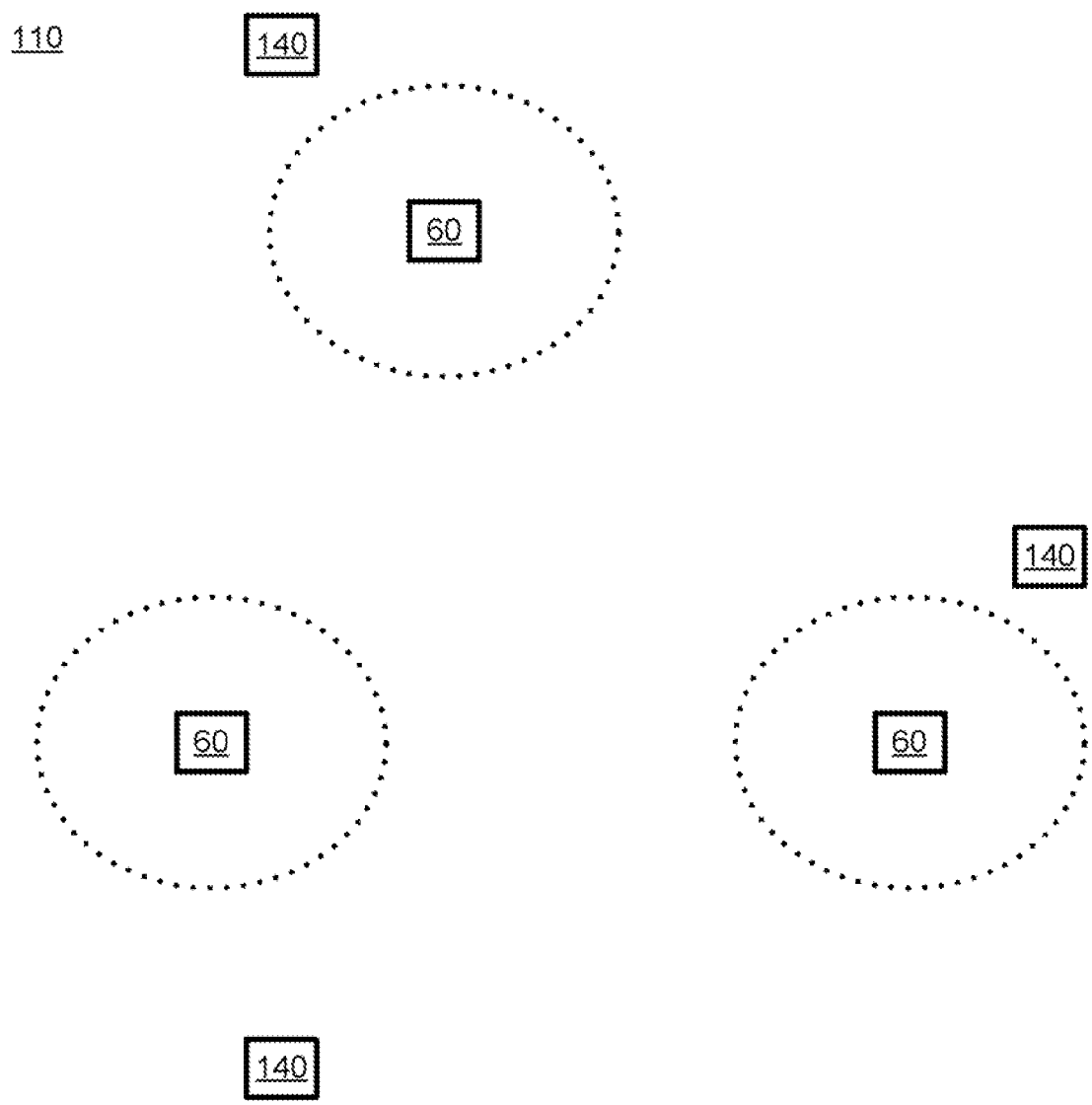
FIGS. 15-18 illustrate an exemplary seventh operational mode in which a combined GPS detection/denial management system is deployed and utilized as a tactical measure.
Figure 16:
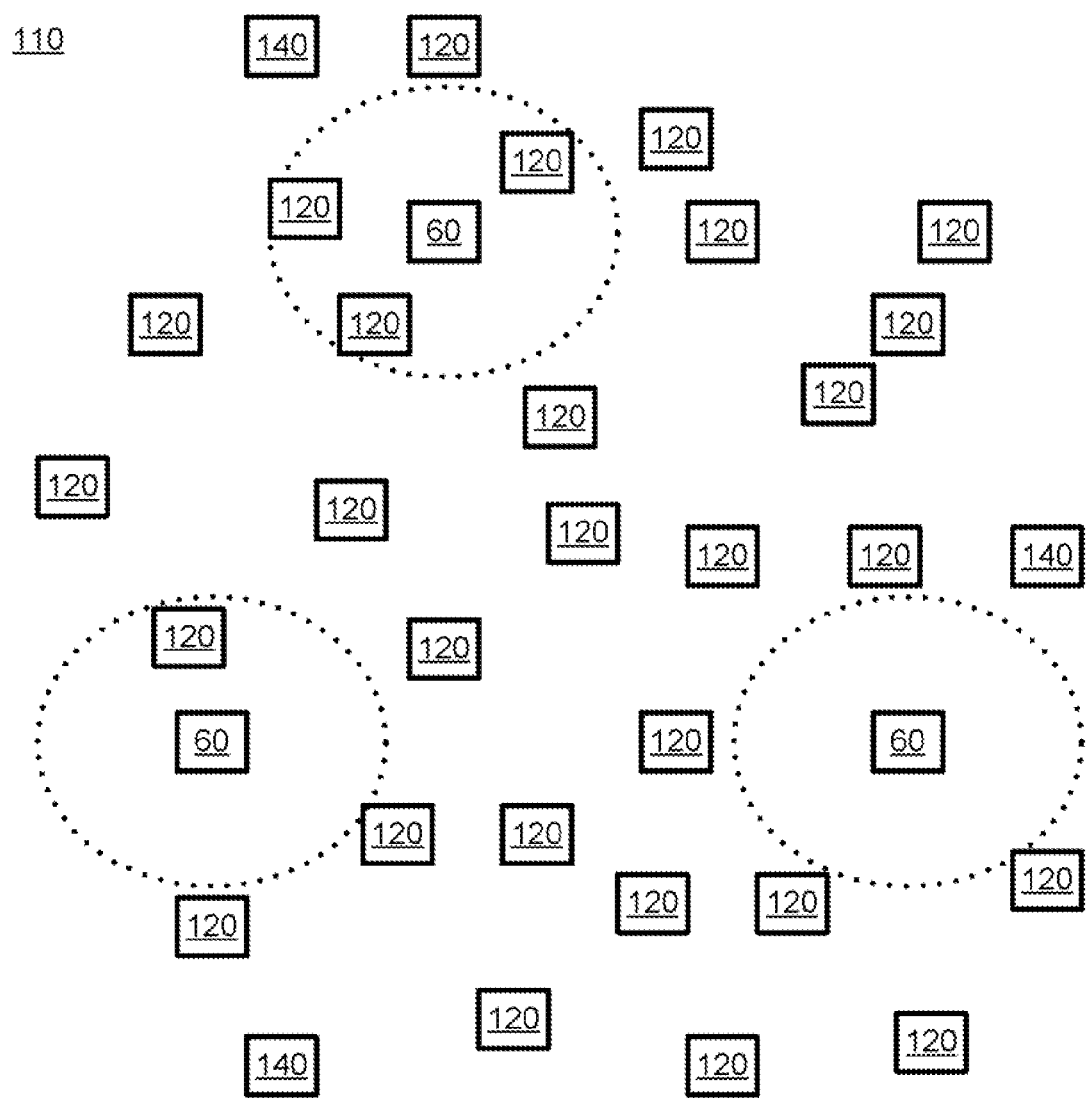

FIGS. 15-18 illustrate an exemplary seventh operational mode in which a combined GPS detection/denial management system 120 is deployed and utilized as a tactical measure. Such a deployment methodology may be utilized, for example, when it is desired to search an area of interest for enemy GPS denial devices 60 for the purpose of identification and possible tactical measures against the GPS denial devices 60, or when it has already been established that such devices 60 are operating and additional identification and possible tactical measures are desired. As shown in FIG. 15, gateways, such as combined GPS detection/denial-equipped gateways 140, may be set up in the area of interest, or, if available, pre-existing gateways may be utilized. Next, as shown in FIG. 16, a multitude of GPS-equipped RSIs, which are preferably combined GPS detection/denial RSIs 120, are deployed in the area of interest. Deployment may be achieved via air drop, by land vehicle, by personnel traveling on foot, or by any combination thereof. Pre-existing RSIs, including any combination of RSI devices 20, 80, 120, may likewise be utilized.

Figure 17:
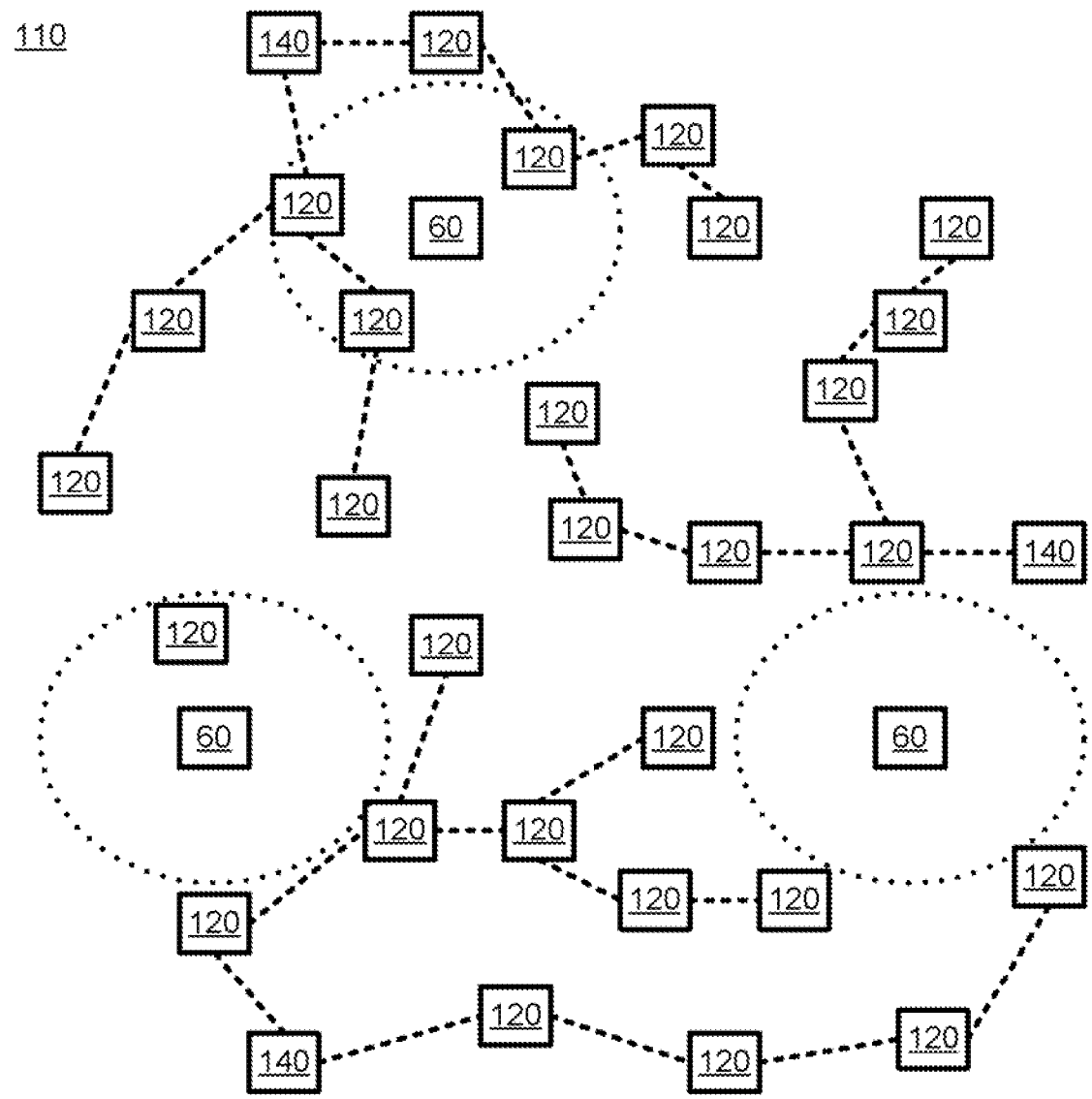

Once deployed, each of the GPS-equipped RSIs 120 may be activated (if not previously activated) via one or more ad hoc wireless networks, as shown in FIG. 17, and GPS parameters from the various GPS receivers 24, in both the RSIs 120 and the gateways 140, may be transmitted back to the gateways 140. The GPS parameters are then communicated via the external network to the server (not shown). As will be apparent, hopping may be used to transmit the GPS parameters from more remotely-located RSIs 120 back to the various gateways 140. If deployment has been successful, some of the GPS-equipped RSIs 120 are within range of the enemy GPS denial devices 60, while others are located out of range of such devices 60. The server 14 assesses all of the GPS parameter data, determining which RSIs 120 and which gateways 140 are within the vicinity of a GPS denial device 60 and where such GPS denial devices 60 are likely to be located. Such determinations may be accomplished using the techniques described hereinabove, including vicinity assessment, direction assessment, and network-aided correction and assessment. The server 14 is preferably capable of accumulating and combining all information thus developed. Further, the server 14 may provide various graphical user interfaces ("GUIs") and/or other user interfaces ("UIs") that may assist user in locating the GPS denial devices 60 and tactical planning with regard an appropriate response to such GPS denial devices 60. As described previously, the server 14 may also provide appropriate information back to one or more of the RSIs 120, gateways 140, and/or other personnel, equipment, and the like.

Figure 18:
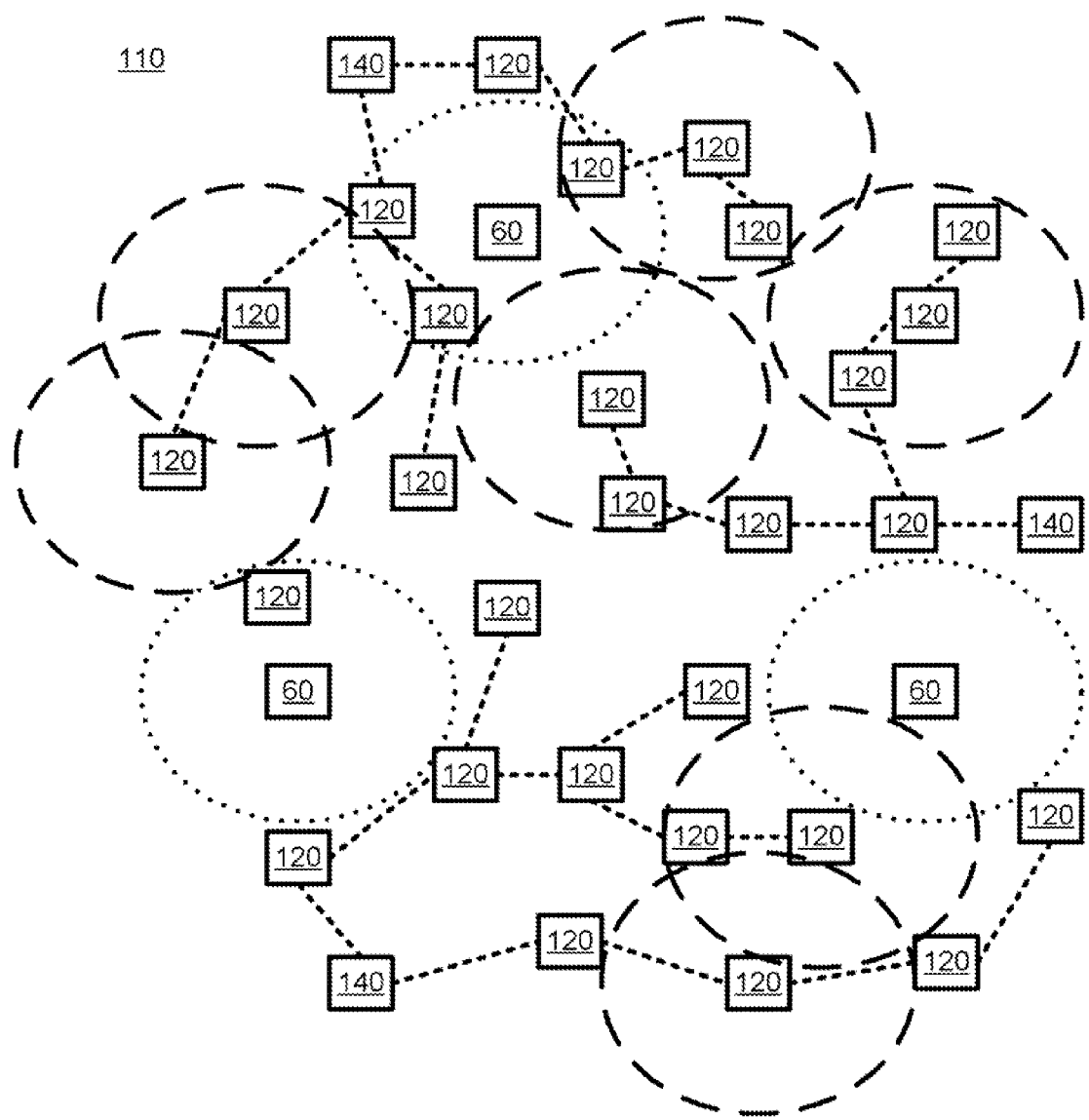

As information about the location of the enemy GPS denial devices 60 is developed, an appropriate tactical response may likewise be developed. As shown in FIG. 18, some of the GPS deniers 84 may be activated, while others remain deactivated. Selection of GPS deniers 84 to be activated may be based on the tactical response chosen for dealing with the enemy GPS denial devices 60. The tactical response may include operations intended to destroy one or more enemy GPS denial devices 60, to disrupt operation of one or more enemy GPS denial devices 60 using electronic techniques and the like, or other tactical strategies. An example of an electronic technique is the use of conventional signal cancellation techniques, where a signal that is an exact inversion of a jamming signal produced by an enemy GPS denial device 60 is transmitted, thereby effectively destroying the jamming signal.

Further, in order to inhibit reliable operation of enemy GPS receivers that may be active in the area of interest, while at the same time permitting continued movement or operation of friendly forces in certain regions of the area of interest, using unaffected GPS receivers, the GPS deniers 84 that are activated may be selected in order to achieve tightly-controlled corridors between the zones of coverage of both enemy and friendly GPS denial devices 60, 84. Such a corridor or region is illustrated in FIG. 18, extending from the lower left corner of the area of interest into the center of the area, and further extending from the center of the area toward the right-hand side of the area. GPS receivers in the corridor may accurately make position determinations. The corridor thus permits free movement or operation, using reliable GPS determinations, as part of a direct tactical response to the enemy GPS denial devices 60 as well as unrelated movement or operation by friendly forces. In summary, this technique, multiple GPS deniers 84 may be deployed with associated RSIs to create a patchwork of GPS deniers 84 to fit situational needs. Advantageously, precise deployment and control of GPS deniers 84 allows defined areas to be selected for jamming without having to deny GPS access to a larger area.

With further regard to deployment tactics, other related approaches include putting GPS receivers 24 on robots, drones or other machines that can be moved throughout an area of interest. The GPS receivers 24 can be replaced with any radio receiver to determine the jamming effects on a receiver in an "area of interest". Parameters from each of these receivers 24 may be different, but the comparison of the parameters by the associated server 14 enables the system 110 to determine the extent of the jamming.

In addition to the advantages described previously herein, the present invention also provides benefits such as the ability to determine the type of GPS denial device 60 so that corrections can be made in the actual position, and improved sensitivity and diversity making detection of GPS denial devices 60 more robust.

The techniques described herein may also be used to measure the effectiveness of actions to remove known GPS denial devices 60. Through an iterative process, a system 110 such as that of FIGS. 15-18 can be utilized to repeatedly search an area of interest for adversarial GPS denial devices 60 after one or more tactical actions have been taken. This step can measure the effectiveness of the tactical operation by determining whether or not the adversarial GPS denial devices 60 are still in operation. The step can also be help identify the presence and location of additional GPS denial devices 60 that had not been previously detected.

Any of the gateways 40, 90, 140 described herein may also or alternatively be carried on an airborne platform, such as an Unmanned Aerial Vehicle (UAV), airship, airplane, or the like. In this scenario, the gateway 40, 90, 140 would communicate to the various RSIs 20, 80, 120 or land-based gateways 40, 90, 140 via wireless LAN (Local Area Network) and communicate over a satellite back to a remote server 14. In at least one embodiment, a gateway controller (comprised of a gateway 40, 90, 140 and a server 14) can also be mounted on the aerial platform and potentially provide database updates remotely.

Notably, at least some of the techniques described herein for locating enemy GPS denial devices 60 may likewise be utilized to identify monitor regions in which GPS reception is affected by friendly GPS deniers 84, to provide feedback regarding the effects of friendly GPS denial attempts, and the like.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A system for operating a GPS receiver in a GPS-adverse environment, comprising:
    (a) a plurality of GPS receivers for receiving radio signals from GPS satellites, wherein each of the plurality of GPS receivers is adapted to determine parameters for itself based on the signals received from the GPS satellites, the parameters including positional parameters, wherein at least one of the GPS receivers, defining a first set of GPS receivers, is able to accurately determine its positional parameters and at least one other of the GPS receivers, defining a second set of GPS receivers, is unable to determine its positional parameters accurately;
    (b) a plurality of remote sensor interfaces, each remote sensor interface of the plurality of remote sensor interfaces being associated with and in electronic communication with a respective GPS receiver of either the first set or second set of GPS receivers such that each remote sensor interface is adapted to extract the GPS parameters from a respective GPS receiver, wherein the plurality of remote sensor interfaces are communication nodes in an ad hoc wireless network such that each of said plurality of remote sensor interfaces is in electronic communication with the other remote sensor interfaces of the plurality of remote sensor interfaces; and
    (c) a computer management system that identifies a GPS receiver that is not accurately determining its positional parameters, and in response, causes GPS information to be provided from a selected GPS receiver in the first set of GPS receivers to the identified GPS receiver;
    (d) whereby the identified GPS receiver is adapted to determine its positional parameters accurately using at least the GPS information provided from the selected GPS receiver in the first set of GPS receivers.

2. The system of claim 1, wherein the computer management system is co-located with the identified GPS receiver at the remote sensor interface associated therewith.

3. The system of claim 1, wherein the computer management system is co-located with the selected GPS receiver, of the first set of GPS receivers, at the remote sensor interface associated therewith.

4. The system of claim 1, wherein the computer management system is located remotely from the remote sensor interfaces.

5. The system of claim 1, further comprising a gateway, serving as a communication node in the ad hoc wireless network, that is adapted to receive the extracted GPS parameters from one or more of the plurality of remote sensor interfaces.

6. The system of claim 5, wherein the computer management system is co-located with the gateway.

7. The system of claim 1, wherein the computer management system is adapted to identify the GPS receiver that is not accurately determining its positional parameters by receiving the extracted GPS parameters from the identified receiver and comparing the determined GPS parameters with historical GPS parameters for the identified GPS receiver.

8. The system of claim 1, wherein the GPS information includes at least one of Ephemeris information, Almanac information, GPS time information, approximate location information, and information on GPS satellites that should be in view of the identified GPS receiver.

9. The system of claim 1, wherein each remote sensor interface includes a standards based radio adapted for transmitting and receiving the GPS information.

10. The system of claim 9, wherein the at least one remote sensor interface includes a Wake-Up Receiver.

11. The system of claim 10, wherein the Wake-Up Receiver is adapted to receive a wireless wake-up signal and to activate the standards based radio in response thereto.

12. A method for determining a location of a GPS receiver in a GPS-adverse environment, comprising:
    (a) providing a plurality of GPS receivers, each interfaced with a respective remote sensor interface, the remote sensor interfaces being communication nodes in an ad hoc wireless network;
    (b) determining the locations of a first set of GPS receivers using radio signals received from GPS satellites;
    (c) communicating GPS information, via the ad hoc wireless network, from one or more GPS receivers of the first set of GPS receivers to an identified GPS receiver that is unable to determine GPS parameters from GPS radio signals received from GPS satellites; and
    (d) determining the location of the identified GPS receiver using the GPS information from the one or more GPS receivers of the first set of GPS receivers.

* * * * *